United States Patent
Lukehart et al.

(10) Patent No.: US 7,994,234 B2
(45) Date of Patent: Aug. 9, 2011

(54) DIAMOND POLYMER BRUSHES

(75) Inventors: Charles M. Lukehart, Nashville, TN (US); Jimmy L. Davidson, Brentwood, TN (US); Alvin M. Strauss, Nashville, TN (US); Lang Li, York, PA (US); Blake T. Branson, Nashville, TN (US)

(73) Assignee: Vanderbilt University, Nashville, TN (US)

( * ) Notice: Subject to any disclaimer, the term of this patent is extended or adjusted under 35 U.S.C. 154(b) by 1089 days.

(21) Appl. No.: 11/727,661

(22) Filed: Mar. 27, 2007

(65) Prior Publication Data

US 2008/0249229 A1    Oct. 9, 2008

(51) Int. Cl.
*C08F 2/44* (2006.01)
*C08K 9/00* (2006.01)
*C01B 31/06* (2006.01)

(52) U.S. Cl. ......... 523/215; 524/496; 524/853; 977/897
(58) Field of Classification Search .................. 977/847, 977/897; 423/446; 523/215; 524/853, 496
See application file for complete search history.

(56) References Cited

U.S. PATENT DOCUMENTS

| | | | |
|---|---|---|---|
| 6,423,465 B1 | 7/2002 | Hawker | |
| 6,780,492 B2 | 8/2004 | Hawker | |
| 6,833,276 B2 | 12/2004 | Klaerner | |
| 7,217,748 B2* | 5/2007 | Hwang et al. | 523/218 |
| 7,276,283 B2* | 10/2007 | Denes et al. | 428/403 |
| 2006/0252853 A1* | 11/2006 | Ajayan et al. | 523/215 |

OTHER PUBLICATIONS

Li, et al, Surface functionalization of nanodiamond paticles via atom transfer radical polymerization, Carbon, 44 (2006), 2308-2315.*
Matrab, et al, "Surface functionalization of ultrananocrystalline diamond using . . . (ATRP) initiated by electro-grafted aryldiazonium salts," Diamond and Related Materials, 15, 2006, 639-644.*
U.S. Appl. No. 60/861,252, Lukehart, Charles, filed Nov. 28, 2006.
Aleksenskii, 1999, The structure of diamond . . . , *Phys. Solid State*, 41, 668-671.
Baskaran, 2004, Polymer-Grafted multiwalled . . . , *Angew. Chem. Int. Ed.*, 43, 2138-2142.
Cataldo, 2003, A study on the action of ozone . . . , *Fuller Nanotubes Car N*, 11, 201-218.
Dementev, 2004, Chemical state of carbon atoms . . . , *Phys. Solid State*, 46, 678-680.
Dolmatov, 2000, Detonation-synthesized nanodiamonds . . . , *J. Superhard Mater.*, 22, 3, 79-82.
Dolmatov, 2000, Detonation-synthesized ultradispersed . . . , *J. Superhard Mater.*, 22, 1, 78-86.
Ekimov, 2002, Mechanical behavior and . . . , *J. Mater. Sci. Lett.*, 21, 1699-1702.
Kato, 1995, Polymerization of methyl methacrylate . . . , *Macromolecules*, 28, 1721-1723.
Kong, 2004, Controlled functionalization of . . . , *J. Am. Chem. Soc.*, 126, 412-413.
Kong, 2004, Constructing amphiphilic polymer . . . , *J. Mater. Chem.*, 14, 1401-1405.
Kulakova, 2004, Surface chemistry of nanodiamonds . . . , *Phys. Solid State*, 46, 636-643.
Li, 2004, Formation of graphitic carbon nanofiber . . . , *Composite Interfaces*, 11, 525-535.

(Continued)

*Primary Examiner* — Fred M Teskin
(74) *Attorney, Agent, or Firm* — John Bruckner PC

(57) ABSTRACT

A composite comprising at least one diamond/polymer brush and a method of making the composite comprising covalently bonding at least one polymer to said diamond surface.

9 Claims, 44 Drawing Sheets

TEM image of as-received UDD (top) and XRD scans (bottom: CuK<x radiation) of as-received and oxidized UDD, UDD-CO₂H.

OTHER PUBLICATIONS

Liu, 2005, Fluorinated nanodiamond as a wet . . . , *J. Am. Chem. Soc.*, 127, 3712-3713.

Matyjaszewski, 1998, Controlled radical polymerization, *ACS Sympos. Ser*, 685, 258-283.

Matyjaszewski, 2002, From atom transfer radical . . . , *Curr. Org. Chem.*, 6, 67-82.

Mowles, 2001, Surface functionalization of VGCNFs . . . , *M.S. thesis*, Vanderbilt University.

Nishikawa, 1997, Evidence for living radical . . . , *Macromolecules*, 30, 2244-2248.

Niyogi, 2002, Chemistry of single-walled carbon . . . , *Acc. Chem. Res.*, 35, 1105-1113.

Qin, 2004, Polymer brushes on single-walled . . . , *J. Am. Chem. Soc.*, 126, 170-176.

Qin, 2004, Functionalization of single-walled . . . , *Macromolecules*, 37, 752-757.

Rodriguez, 1995, Catalytic engineering of carbon . . . , *Langmuir*, 11, 3862-3866.

Shenderova, Carbon nanostructures, *Crit. Revs. Solid State Mater. Sci.*, 27, 227-356.

Sinani, 2005, Aqueous dispersions of single-wall . . . , *J. Am. Chem. Soc.*, 127, 3463-3472.

Wang, 1995, Controlled "living" radical . . . , *J. Am. Chem. Soc.*, 117, 5614-5615.

Xu, 2004, Mechanical property characterization . . . , *J. Composite Mater.*, 38, 1563-1582.

Yao, 2003, Polymerization from the surface of . . . , *J. Am. Chem. Soc.*, 125, 16015-16024.

Zhao, 2005, Synthesis and characterization of . . . , *J. Am. Chem. Soc.*, 127, 8197-8203.

Zhong, 2005, Graphitic carbon nanofiber (GCNF) . . . , *Polym. Composites*, 26, 128135.

Zhu, 2004, Chemical mechanical modification . . . , *Phys. Solid State*, 46, 681-684.

* cited by examiner

TEM image of as-received UDD (top) and XRD scans (bottom; CuKα radiation) of as-received and oxidized UDD, UDD-CO₂H.

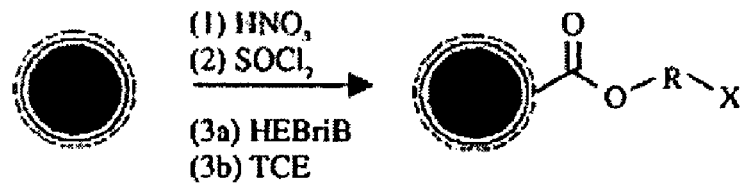
UDD    1, R= CH₂CH₂OC(O)CMe₂; X= Br,    UDD-Br
         2, R= CH₂CCl₂; X= Cl,              UDD-Cl
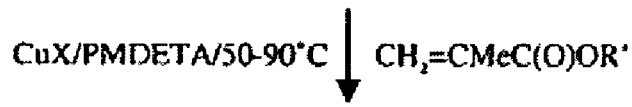
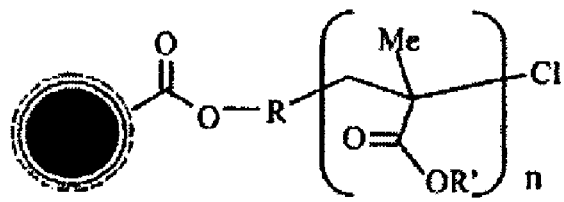
| Brush | R | R' | Abbrev. |
|---|---|---|---|
| 1a | CH₂CH₂OC(O)CMe₂ | i-Bu | UDD-PiBMA-1 |
| 2a | CH₂CCl₂ | i-Bu | UDD-PiBMA-2 |
| 2b | CH₂CCl₂ | t-Bu | UDD-PtBMA |
| | | | |
|---|---|---|---|
| 2c | CH₂CCl₂ | OH | UDD-PMAA |
Fig. 2. UDD-polymer brush synthesis.

TEM micrographs of the UDD-PiBMA-1 brush, 1a, at two different magnifications.

AFM tapping-mode height and phase images of the UDD-PiBMA-I brush, la, as spin-coated onto a mica surface.

FT-IR spectra of UDD, UDD-C02H, UDD-Br and of the UDD/ polymer brush, 1a.

Solution 1H-NMR spectra of UDD/polymer brush 1a and of PiBMA in CDCl3 solution.

TGA traces of UDD-CO2H, UDD-Br, UDD-PiBMA-1, and of pure PiBMA.

Dispersibility test of UDD-polymer brushes in common solvents (ca. 2.5 mg/mL)
As-received UDD in
A) Acetone
UDD-PiBMA brush in
B) Acetone, C) Toluene/$H_2O$,
D) $H_2O$/$CCl_4$, and E) MeOH
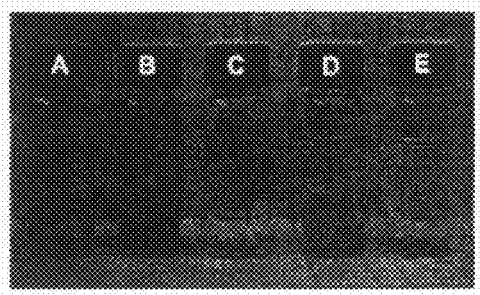
UDD-PiBMA brush in
A) $H_2O$/$CHCl_3$
B) Toluene/$H_2O$
UDD-PMAA brush in
C) Toluene/$H_2O$
D) $H_2O$/$CHCl_3$
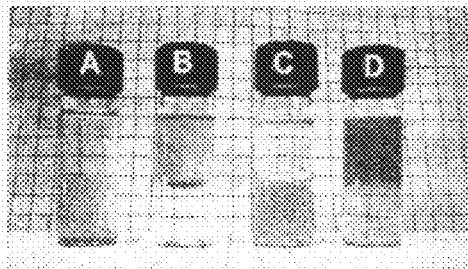
Fig. 8

FT-IR spectra of UDD, UDD-Cl, and of UDD-PiBMA-2.

FT-IR spectra of UDD, UDD-Cl, UDD-PtBMA, and of UDD-PMAA.

Fig. SD4. TGA traces of UDD, UDD-Cl, c-UDD-2, UDD-PiBMA-2, and of PiBMA-1.

TGA traces of UDD, UDD-Cl, c-UDD-3, UDD-PMAA, UDD-PtBMA, and of PtBMA.

BET analysis of (A) UDD, (B) UDD-CO$_2$H, (C) c-UDD-1, and of (D) UDD-PiBMA-1.

BET analysis of (A) UDD, (B) c-UDD-2, and of (C) UDD-PiBMA-2

BET analysis of (A) UDD, (B) c-UDD-3, and of (C) UDD-PtBMA.

Dispersibility test: as-received UDD in acetone, vial A, and the hydrophobic UDD-PiBMA-1 brush, 1a, in acetone, vial B, in toluene(upper)/H$_2$O(lower), vial C, in H$_2$O(upper)/CCl$_4$(lower), vial D, and in methanol, vial E. Concentration of the dispersions is about 2.5 mg/mL.

Dispersibility test: as-received UDD in CCl$_4$, vial A, and the hydrophobic UDD-PiBMA-2 brush, 2a, in H$_2$O(upper)/CCl$_4$(lower), vial B, in toluene(upper)/H$_2$O(lower), vial C, in acetone, vial D, and in methanol, vial E. Concentration of the dispersions is about 2.5 mg/mL.

General Mechanism of ATRP
Initiation
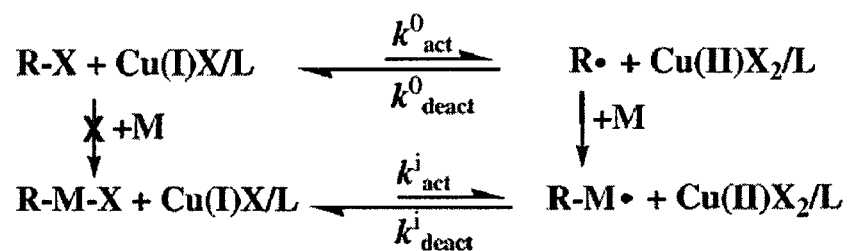
Propagation
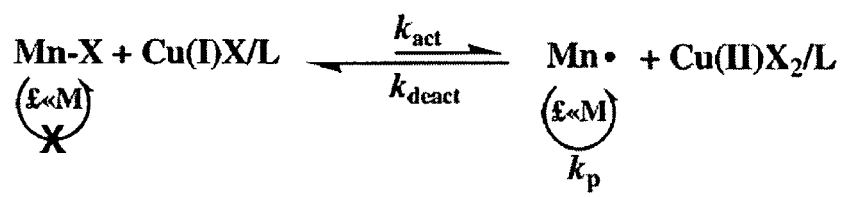
Fig. 19

Ultradispersed Diamond (UDD)

Preparation: Detonation synthesis of UDD from carbon containing explosives

Shenderova, O. A. et al. Critical Reviews in Solid State and Materials Sciences 2002, 27, 227-356.

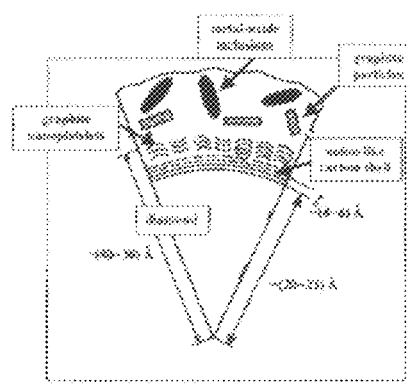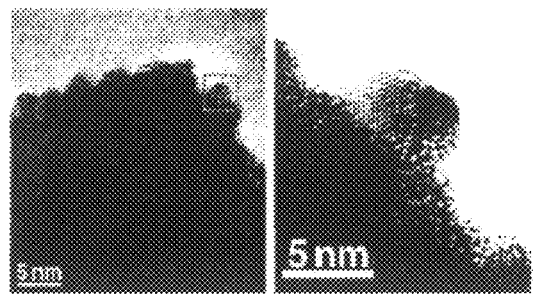
Fig. 22

Properties of Ultradispersed Diamond

| | |
|---|---|
| Monocrystal size | 4-6 nm |
| Size of uncrushable aggregates | 20-50 nm |
| Density | 3.3 g/cm$^3$ |
| Specific surface area | 300-400 m$^2$/g |
| Electrical Resistivity | 7.7×10$^9$ Ωm |
| Refractive index | 2.55 (at λ=580nm) |

Fig. 23

Kinetic plot of polymer brush content versus polymerization time of UDD-PGMA-3 ( [GMA]: [PMDETA]:[CuCl]:[CuCl$_2$] =100:1:1).

FTIR spectra of as-received UDD, UDD-PGMA polymer brush, and PGMA polymer.

TGA traces of as-received UDD, UDD-PGMA polymer brush samples with different polymerization time of 4h, 24h, and 120h, and PGMA polymer.

Tapping mode images of UDD-PGMA polymer brush spin-coated on a mica surface: A) Height image, B) Phase image, C) Cross-intersectional height profile.

Kinetic plots of polymer brush content versus polymerization time: UDD-POMA-1(square) [OMA]:[TCE]:[PMDETA]:[CuCl]:[CuCl$_2$]=100:0.1:1:1:0; UDD-POMA(circle) [OMA]:[TCE]:[PMDETA]:[CuCl]:[CuCl$_2$]=100:0:1.1:1:0.1; UDD-POMA-3 (triangle) [OMA]:[TCE]:[PMDETA]:[CuCl]:[CuCl$_2$]=100:1:1:1

FTIR spectra of as-received UDD, UDD-POMA polymer brush, and POMA polymer.

TGA traces of UDD-Cl, UDD-POMA-1 aliquots of 1h, 4h and 24h, and POMA polymer.

$^1$H-NMR spectra of UDD-POMA-4 (polymer content 15 wt%), UDD-POMA-1 (polymer content 55 wt%), and POMA polymer in CDCl$_3$.

Tapping mode images of UDD-POMA polymer brush spin-coated on a mica surface: A) Height image, B) Phase image, C) Cross-intersectional height profile.

HR-TEM image of UDD-POMA polymer brush sample. POMA-1 (right) in transformer oil at the concentration of 2.5 mg/mL at room temperature.

UDD-epoxide hybrid materials synthesis

FT-IR spectra of as-received UDD and UDD-epoxides.

BET results of as-received UDD and UDD-epoxides.

XRD scans of as-received UDD and UDD-Glycidol-1.

TGA traces of UDD-Glycidol-1 at different reaction time.

TGA traces of UDD-Glycidol-2 at different reaction time.

Rockwell E hardness as a function of UDD loading in epoxy/UDD-PGMA composites.

UDD-PGMA/Epoxy Composite Hardness Results

UDD-PGMA/Epoxy Tensile Test Results: Modulus of Elasticity

UDD-PGMA/Epoxy Tensile Test Results: Ultimate Tensile Strength

DIAMOND POLYMER BRUSHES

The invention is predicated on research at least partially funded by a U.S. Army grant W911NF-04-2-0023. The entire contents and disclosures of each of the patents, patent applications and literature references set forth herein are incorporated by reference.

FIELD OF THE INVENTION

The present invention relates to novel diamond/polymer composites and the wide variety of utilities therefore.

BACKGROUND OF THE INVENTION

Polymer brush composites comprising polymers bonded to solid substrates are known in the prior art as evidenced by the disclosures in U.S. Pat. Nos. 6,833,276; 6,780,492 and 6,423,465.

Interest in developing carbon nanostructures appropriately surface-derivatized for diverse applications remains high. Considerable progress has been made in controlling the dispersibility and wettability properties of single-walled (SWNTs) or multi-walled (MWNTs) carbon nanotubes through either covalent or non-covalent surface derivatization. [Sinani et al, *J. Am. Chern. Soc.* 2005, 127, 3463; Zhao et al, *J. Am. Chern. Soc.* 2005, 127, 8197; Niyogi et al, *Ace. Chern. Res.* 2002, 35, 1105].

Most recently, radical initiator functional groups appropriate for effecting in situ atom-transfer-radical-polymerization (ATRP) have been grafted to surface sites on SWNTs or MWNTs to form SWNT/poly(n-butyl methacrylate), SWNT/poly(acrylic acid), SWNT/poly(methyl methacrylate), SWNT/poly(tert-butyl acrylate), SWNT/poly(acrylic acid), MWNT/poly(methyl methacrylate), and MWNT/poly(methyl methacrylate)$_x$(hydroxyethyl methacrylate)$_y$ as polymer brushes having either hydrophobic or hydrophilic surfaces [Qin et al, *J. Am. Chern. Soc.* 2004, 126, 170; Qin et al, *Macromolecules* 2004, 37, 752; Kong et al, *J. Am. Chem. Soc.* 2004, 126, 412; Yao et al, *J. Am. Chem. Soc.* 2003, 125, 16015].

ATRP methods have also been used to extend polymer chains within carbon nanotube/polymer brushes [Baskaran et al, *Angew. Chem., Int. Ed. Engl.* 2004, 43, 2138; Kong et al, *J. Mater. Chem.* 2004, 14, 1401].

Graphitic carbon nanofibers (GCNFs) represent a class of nanostructured carbon fibers having atomic structures uniquely different from that of carbon nanotubes [Rodriguez et al, *Langmuir* 1995, 11, 3862; Mowles, E. D. *Surface Functionalization of VGCNFs with Pendant Amino Groups*, M. S. thesis, Vanderbilt University 2001]. Herringbone GCNFs possess canted graphene sheets (also described as geodesic-like conical graphene sheets) stacked in a nested fashion along the long fiber axis. GCNFs of this type can be prepared having average diameters from 25 nm-200 nm and lengths on the micron scale. The graphitic atomic structure of herringbone GCNFs gives a carbon nanofiber long-axis surface comprised of C(sp$^2$) edge sites, usually passivated by hydrogen atoms.

The surface-functionalization of herringbone GCNFs with reactive linker molecules using surface oxidation and carboxyl group coupling chemistry occurs without degradation of the structural integrity of the GCNF backbone and affords surface-derivatized GCNFs having a high surface density of functional groups [Zhong et al, *Polym. Compos.* 2005, 26, 128]. Covalent binding of such linker molecules to either polymer resins or ceramic condensation oligomers gives GCNF/polymer or GCNF/ceramer hybrid materials [Zhong et al, *Polym. Compos.* 2005, 26, 128; Li et al, *Compos. Interfaces* 2004, 11,525; Xu et al, *J. Compos. Mater.* 2004, 38, 1563].

Novel graphitic carbon nanofiber (GCNF)/polymer brushes and a novel method for their synthesis are disclosed in provisional application U.S. Ser. No. 60/861,252.

It is an object of the invention to provide novel diamond/polymer hybrid composites or brushes as well as methods for their synthesis.

BRIEF DESCRIPTION OF THE DRAWINGS

FIGS. 2, 18-22 and 35 set forth reaction schemes for various embodiments of the invention.

FIGS. 7, 11, 12, 26, 31 and 39-40 are TGA analyses of various embodiments of the invention.

FIGS. 8, 16 and 17 depict dispersibility tests of various embodiments of the invention.

FIGS. 23, 24, 28, 29, 38 and 41-44 are tabular and graphical representations of various embodiments of the invention.

SUMMARY OF THE INVENTION

The above and other objects are realized by the present invention, one embodiment of which relates to either hydrophobic or hydrophilic diamond/polymer brushes.

A further embodiment of the invention concerns articles of manufacture comprising the above described brushes.

DETAILED DESCRIPTION OF THE INVENTION

The present invention is predicated on the discovery that a greater complexity of functional group derivatization can be produced by grafting organic polymers to a diamond surface sites to give diamond/polymer brushes having tunable dispersibilities and surface reactivity.

It will be recognized by those skilled in the art that the present invention is amenable to the preparation of a wide variety of diamond/polymer materials.

Figure 18:
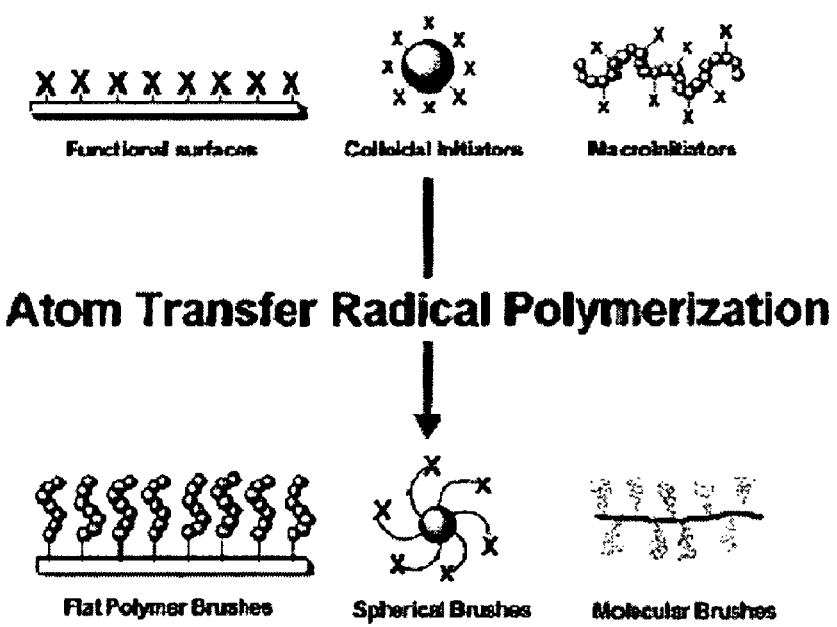

According to one embodiment of the present invention, graphitic carbon nanofiber diamond/polymer brushes may be prepared by atom-transfer-radical polymerization (ATRP) using the "grafted-from" synthesis strategy. See FIGS. 18 and 19. Preferably, ultradispersed diamonds (UDD) or nanodiamonds are employed. Polymerization of acrylate esters, for example, is conducted at surface sites covalently Derived with ATRP initiators to form, for example, hydrophobic composites such as Diamond/poly(n-butyl acrylate), diamond/poly(iso-butyl methacrylate), diamond/poly (tert-butyl acrylate), diamond/poly(octadecyl methacrylate), diamond/poly (methyl methacrylate) and hydrophilic brushes such as diamond/poly(acrylic acid) [GCNF-PAA]. Moreover, acid hydrolysis of the GCNF/acrylate/methacrylate) polymer brushes also yields hydrophilic diamond/poly(acrylic/methacrylic acid) polymer brushes. The "grafted-from" approach in which a radical initiator, such as (4-hydroxymethyl)-benzyl 2-bromopropionate (HBBP) or 2-hydroxyethyl-2'-bromopropionate (HEBP), is covalently coupled to surface carboxylic acid sites of oxidized diamonds, diamond-$CO_2H$ is adapted from Wang et al, *J. Am. Chem. Soc.* 1995, 117, 5614.

Other diamond/polymer brushes, such as, diamond/epoxy oligomer [poly(glycidyl methacrylate)] brushes, for example, may be prepared by a simple surface reaction of the diamond substrate with the appropriate monomer.

The invention also contemplates the production of diamond/polymer brush-polymer hybrids or composites such as, e.g., diamond/poly(glycidyl methacrylate)-commercial epoxy resin (EPON 828) hybrid, diamond/poly(glycidyl methacrylate)-commercial epoxy resin (DER331/DER736 blend) hybrid and diamond/poly(methyl methacrylate)-physical blend in PMMA composite.

Solution dispersibilities of the diamond/polymer brushes of the invention are controlled by the solubility properties of the polymer brush component. Diamond/poly(acrylate ester) brushes are hydrophobic, while the diamond/poly(acrylic acid) brush is hydrophilic. Because of the unique atomic structure of diamonds, a high surface density based on surface area measurements and GPC data, the calculated surface density of a representative UDD/polymer brush material is ca. five polymer chains/100 $nm^2$. A wide variety of UDD/polymer brush materials having controlled dispersibilities and functional group reactivities are now available using this synthesis strategy.

It will be recognized by those skilled in the art that the present invention is amendable to the preparation of a wide variety of diamond/polymer materials.

Figure 21:
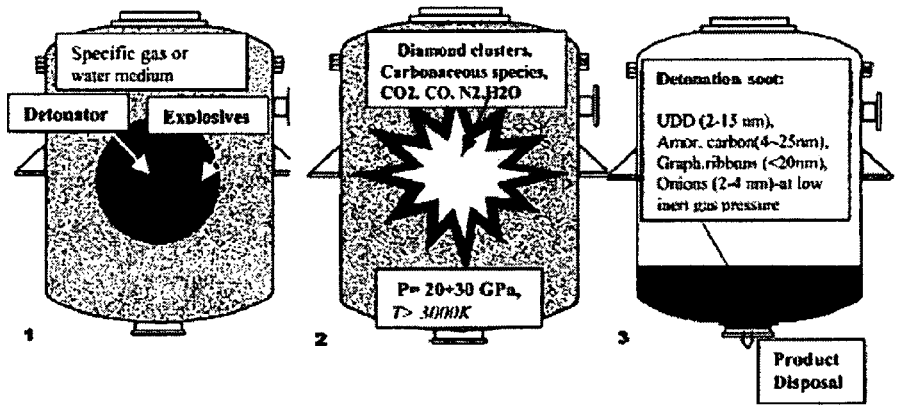

The diamond/polymer brushes of the present invention find application in hybrid materials, nanofluids with enhanced thermal conductivity, reinforcement additives in polymer composites, MRI contrast reagents in radiology and medical research, composites with polymers, metals and ceramics ceramics, nanocomposite coatings with enhanced strength and wear resistance, medical coatings, galvanic process, polishing, additions to lubricants, magnetic recording systems, electrodes for fuel cells, and the like Ultradispersed diamond (UDD), frequently referred to as "nanodiamond", is obtained on commercial scale by the detonation of carbonaceous explosives [O. A. Shenderova, V. V. Zhirnov and D. W. Brenner, Carbon nanostructures, *Crit Rev Solid State* 27 (2002) (3-4), pp. 227-356; see FIGS. 21-23]. UDD powder typically consists of 4-6 nm diamond nanocrystals coated by a fullerene-like carbon matrix aggregated into particles 2050 nm in diameter [A. E. Aleksenskii, M. V. Baidakova, A. Y. Vul' and V. I. Siklitskii, The structure of diamond nanoclusters, *Phys Solid State*+41 (1999) (4), pp. 668-671]. Incorporation of UDD powder into coatings or bulk materials is of considerable interest to impart the remarkable properties of diamond to surfaces and composites.

Physical blends of UDD with various organic phases have been used to improve the wear- and corrosion-resistance of galvanic coatings [V. Y. Dolmatov and G. K. Burkat, Detonation synthesized ultradisperse diamonds as a basis for novel class of composite metal-diamond galvanic coatings, *J Superhard Mater* (2000) (1), pp. 84-95], lubricating oils/greases, and magnetic media coatings. Several potential medical applications of UDD-blended materials have also been noted [V. Y. Dolmatov and L. N. Kostrova, Shock wave-synthesized nanometric diamond and potentials for development of new generation of medicinal preparations, *J Superhard Mater* (2000) (3), pp. 82-85].

The UDD/polymer blended composites of the present invention, however, show enhanced mechanical strengths, wear resistances, and thermal stabilities over their prior counterparts [E. A. Ekimov, E. L. Gromnitskaya, S. Gierlotka, W. Lojkowski, B. Palosz and A. Swiderska-Sroda et al., Mechanical behavior and microstructure of nanodiamond-based composite materials, *J Mater Sci Lett* 21 (2002) (21), pp. 1699-1702]. Partial oxidation of the graphitic shell layer phase of UDD is readily achieved and has been used to facilitate surfactant interactions and to enhance poor UDD dispersibility [A. P. Dement'ev and K. I. Maslakov, Chemical state of carbon atoms on the surface of nanodiamond particles, *Phys Solid State+* 46 (2004) (4), pp. 678-680; I. I. Kulakova, Surface chemistry of nanodiamonds, *Phys Solid State+* 46 (2004) (4), pp. 636-643; F. Cataldo and A. P. Koscheev, A study on the action of ozone and on the thermal stability of nanodiamond, *Fuller Nanotubes Car N* 11 (2003) (3), pp. 201-218 and Y. W. Zhu, X. Q. Shen, B. C. Wang, X. Y. Xu and Z. J. Feng, Chemical mechanical modification of nanodiamond in an aqueous system, *Phys Solid State+* 46 (2004) (4), pp. 681-684]. Recently, the formation of novel glass coatings of dispersed, surface-fluorinated UDD has been reported [Y. Liu, V. N. Khabashesku and N. J. Halas, Fluorinated nanodiamond as a wet chemistry precursor for diamond coatings covalently bonded to glass surface, *J Am Chem Soc* 127 (2005) (11), pp. 3712-3713].

For bulk-scale applications utilizing UDD, such as fabrication of composite materials, the dispersion limitations of surface-oxidized or small-linker-molecule-activated UDD need to be greatly enhanced. Controlling the surface reactivity and hydrophobic/hydrophilic dispersion properties of surface-functionalized UDD is highly desirable. These objectives are achieved by the present invention using a synthesis strategy by which organic polymers of choice can be grown directly from UDD aggregate surfaces in remarkably high surface density.

Exemplified below are the syntheses of a wide variety of UDD/polymer brush materials. For example, UDD/poly(isobutyl methacrylate), UDD-PiBMA, UDD/poly(tert-butyl methacrylate), UDD-PtBMA, and UDD/poly(methacrylic acid), UDD-PMAA are prepared by atom transfer radical polymerization Techniques (ATRP) [J. S. Wang and K. Matyjaszewski, Controlled living radical polymerization—atom-transfer radical polymerization in the presence of transition-metal complexes, *J Am Chem Soc* 117 (1995), pp. 5614-5615; M. Kato, M. Kamigaito, M. Sawamoto and T. Higashimura, Polymerization of methyl-methacrylate with the carbon-tetrachloride dichlorotris(triphenylphosphine)ruthenium(II) Methylaluminum Bis(2,6-Di-Tert-Butylphenoxide) initiating system—possibility of living radical polymerization, *Macromolecules* 28 (1995), pp. 1721-1723; K. Matyjaszewski, From atom transfer radical addition to atom transfer radical polymerization, *Curr Org Chem* 6 (2002), pp. 67-82; T. Nishikawa, T. Ando, M. Kamigaito and M. Sawamoto, Evidence for living radical polymerization of methyl methacrylate with ruthenium complex: effects of protic and radical compounds and reinitiation from the recovered polymers, *Macromolecules* 30 (1997), pp. 2244-2248 and K. Matyjaszewski, Mechanistic aspects of atom transfer radical polymerization, *ACS Symp Ser* 685 (1998), pp. 258-283] using a "grafting-from" approach in which a radical initiator, such as hydroxyethyl-2-bromoisobutyrate (HEBriB) or 2,2,2-trichloroethanol (TCE), is covalently coupled to surface carboxylic acid sites, UDD-$CO_2H$, via an ester linkage. In situ ATRP of monomers present in solution from grafted initiator molecules gives the corresponding UDD/polymer brush materials. Both hydrophobic and hydrophilic UDD/polymer brushes have been prepared.

It will be appreciated by those skilled in the art that the examples set forth below are merely illustrative of the invention and in no way limit the invention to the particular materials employed. Those same skilled artisans will realize that, without the exercise of inventive faculties, the invention is equally applicable to any diamond surface(s) as well as a wide variety of polymers.

In the following examples, the following materials and reagents were employed: Ethylene glycol (99.8%), 2-bromo-2'-methylpropionyl bromide (97%), ethyl 2-bromoisobutyrate (EBriB, 98%), 2,2,2-trichloroethanol (TCE, 98%), CuBr (99.999%), CuCl (99.999%), N,N,N',N'',N''-pentamethyldiethylenetriamine (PMDETA, 99%), and triethylamine (TEA, 99.5%). Iso-butyl methacrylate (99%) and tert-butyl methacrylate (98%) were purified by passing through an alumina column and stored under $N_2$ at $-15°$ C. before use.

Transmission electron microscopy (TEM) was performed on a Philips CM-20T Electron Microscope operated at 200 keV. Three hundred megahertz of $^1$H-NMR spectra were recorded on a Bruker AC300 Fourier transform spectrometer, using $CDCl_3$ as solvent. Infrared spectra (IR) were obtained from KBr pressed pellets on an ATI Mattson Genesis Series FT-IR spectrometer. thermogravimetric analyses (TGA) were performed on a thermal analysis instruments high-resolution TGA 2950 thermogravimetric analyzer. Elemental analysis was performed by Atlantic Microlab, Inc., Norcross, Ga. BET surface-area analysis was carried out on a NOVA 1000 High Speed surface area and pore size analyzer with nitrogen gas as the absorbent. Atomic force microscopy (AFM) images were taken with a Digital Instruments Multimode IIIa Nanoscope SPM in tapping mode using standard silicon cantilevers with a resonance frequency around 330 kHz. To prepare AFM samples, UDD/polymer brush sample was dispersed in THF at a concentration about $1 \times 10^{-4}$ mg/mL under sonication for 1 h, followed by spin casting 1-2 drops of the dispersion on the freshly cleaved mica surface at the spin speed of 4000 rpm at room temperature. Polymer molecular weights and polydispersity measurements were obtained by gel permeation chromatography (GPC) using a Waters GPC equipped with four 5 mm Waters columns (300 mm×7.7 mm) connected in series with increasing pore size and a Waters 2414 refractive index detector. Polystyrene standards were used as calibration, and THF was used as eluent at a flow rate of 1.00 ml/min.

Example 1

Synthesis of hydroxyethyl-2-bromoisobutyrate (HEBriB)

A 500-mL round-bottomed flask was charged with 31.0 g (0.50 mol) ethylene glycol, 16.0 mL (0.114 mol) TEA, and 200 mL anhydrous THF. The solution was cooled to 0° C., and a solution of 23.0 g (0.10 mol) 2-bromo-2'-methylpropionyl bromide dissolved into 20 mL anhydrous THF was added drop-wise under nitrogen in 2 h. Then the reaction mixture was raised to 45° C. and stirred for 24 h. Solids were removed by suction filtration, and the solvent was removed under reduced pressure. The remaining solids were dissolved into 100 mL deionized water and extracted with $CH_2Cl_2$ three times. The organic phase was dried over $MgSO_4$ overnight followed by rotary evaporation to remove the solvent. The colorless liquid product was collected by distillation under reduced pressure in 77.8% yield. $^1$H-NMR (300 MHz, $CDCl_3$): δ 1.90 (—$C(CH_3)_2Br$), 4.29 (—$CH_2$—OCO—), 3.85 (HO—$CH_2$—), 2.06 (HO—$CH_2$—).

Example 2

Preparation of HebriB-Immobilized UDD (UDD-Br)

Surface oxidization of as-received UDD (1.00 g) was performed in 100 mL concentrated nitric acid at 140° C. for 6 h. The oxidation product, UDD-$CO_2H$, was diluted with deionized water and filtered through a 0.2 µm millipore nylon membrane. After thorough washing with deionized water, UDD-$CO_2H$ was dried in vacuo at room temperature for 48 h. Acylation of surface-oxidized UDD was carried out by reacting 0.70 g UDD-$CO_2H$ with 24.5 g thionyl chloride at 70° C. for 24 h in the presence of 0.40 g DMF. The mixture was cooled to room temperature and washed with anhydrous THF under nitrogen. The acylation product, UDD-C(O)Cl, was dried by a nitrogen flow at room temperature. A 100-mL round-bottomed flask was charged with 0.56 g UDD-C(O)Cl, 10.00 g HEBriB and 0.02 g TEA. The mixture was allowed to react at 75° C. under nitrogen for 140 h. The solid was filtered through a 0.2 µm Millipore Nylon membrane, and the residue was washed with methanol six times to remove excess HEBriB and TEA. The product was collected and dried in vacuum at room temperature overnight. Elemental analysis (wt. %): C, 86.55; H, 0.56; 0, 9.79; N, 2.22; Br, 0.88.

Example 3

Preparation of TCE-Immobilized UDD (UDD-Cl)

Without additional surface oxidation, 2.43 g as-received UDD was directly reacted with 75.0 g thionyl chloride at 70° C. for 48 h in the presence of 1.0 g DMF. The mixture was cooled to room temperature and washed with anhydrous THF under nitrogen. The acylation product, UDD-C(O)Cl, was dried with a nitrogen flow at room temperature. A 100-mL round-bottomed flask was charged with 2.20 g UDD-C(O)Cl, 20.0 g TCE and 0.04 g TEA, and the flask was heated in a 75° C. oil bath for 110 h. The purification process for the product of UDD-Cl was the same as that of UDD-Br. Elemental analysis (wt. %): C, 87.99; H, 0.55; 0, 8.27; N, 2.36; Cl, 0.83.

Example 4

Synthesis of UDD-poly(iso-butylmethacrylate) Using UDD-Br (UDD-PiBMA-1)

Equipped with a stirring bar, a 25-mL dried, round-bottom flask was charged with 0.2 g UDD-Br and 12.3 mg (0.124 mmol) CuCl. The flask was sealed with a rubber septum and degassed and refilled with nitrogen three times. Deoxygenated acetone (4 mL) was added into the flask followed by adding 26 µL (0.124 mmol) PMDETA via syringe. The mixture was sonicated for 15 min to form an even dispersion. After adding 4 mL (24.7 mmol) deoxygenated iso-butylmethacrylate via syringe, the flask was heated in a 50° C. oil bath for 22 h. The reaction was quenched by liquid nitrogen and THF was added to disperse the solids. The product was filtered through a 0.2 µm millipore nylon membrane and washed with THF. The dispersion-filtration-wash process was repeated six times. Then the solids were dispersed in methanol followed by filtration to remove catalyst. The collected product was dried in vacuum at room temperature for 16 h.

Example 5

ATRP of Iso-BMA in the Presence of as-Received UDD (c-UDD-1/c-PiBMA-1)

A 25-mL dried, round-bottom flask was charged with 0.20 g UDD and 12.3 mg (0.124 mmol) CuCl. The flask was sealed with a rubber septum and degassed and refilled with nitrogen three times. Deoxygenated acetone (4 mL) was added into the flask followed by the addition of 26 μL (0.124 mmol) PMDETA via syringe. The mixture was sonicated for 15 min to form a uniform dispersion. Then 4 mL (24.7 mmol) deoxygenated iso-butylmethacrylate was added into the flask via syringe, and the mixture was stirred for 5 min. Finally, 36.4 μL (0.247 mmol) EBriB was added via syringe, and the flask was heated in a 50° C. oil bath for 22 h. The reaction was quenched by liquid nitrogen and THF was added to disperse the solids. The product was filtered through a 0.2 μm millipore nylon membrane and washed with THF. The filtrate was passing through an alumina column, rotary evaporating to remove the solvent, and vacuum drying at 50° C. for 16 h. The solid residue was purified by repeated dispersion-filtration-wash process using THF four times to remove un-grafted polymers. The collected solid was dried in vacuum at room temperature for 16 h.

Example 6

ATRP of Iso-BMA Initiated by EBriB (PiBMA-1)

The polymerization procedures are the same as those described in Example 5 except that no as-received UDD was involved. A comparison of reaction conditions and results of ATRP of iso-BMA monomer with Br-based initiator in the absence and presence of as-received UDD is provided in Table 1, respectively.

TABLE 1

Conditions and results of ATRP of iso-BMA with Br-based initiators in acetone$^a$

| Sample | [iso-BMA]:[I]$^c$ | t (h) | $M_n$ | $M_w/M_n$ | Yield (%) |
|---|---|---|---|---|---|
| PiBMA-1 | 100:1 | 20 | 14,800 | 1.11 | 82.1 |
| c-PiBMA-1$^b$ | 100:1 | 22 | 15,600 | 1.09 | 80.3 |

$^a$At a catalyst ratio, [iso-BMA]:[CuCl]:[PMDETA], of 200:1:1 at 50° C.
$^b$In the presence of as-received UDD.
$^c$[I] = [EBriB].

Example 7

Synthesis of UDD-poly(iso-butylmethacrylate) Using UDD-Cl (UDD-PiBMA-2)

A 25-mL dried, round-bottom flask was charged with 0.2 g UDD-Cl and 17.8 mg (0.124 mmol) CuBr. The flask was sealed with a rubber septum and degassed and refilled with nitrogen for three times. Deoxygenated acetone (4 mL) was added into the flask followed by the addition of 26 μL (0.124 mmol) PMDETA via syringe. The mixture was sonicated for 15 min to form a uniform dispersion. After the addition of 4 mL (24.7 mmol) deoxygenated iso-butylmethacrylate via syringe, the flask was heated in a 60° C. oil bath for 24 h. The purification process of the UDD-PiBMA-2 product was the same as that described above.

Example 8

ATRP of iso-BMA in the Presence of as-Received UDD (c-UDD-2/c-PiBMA-2)

A 25-mL dried, round-bottom flask was charged with 0.20 g UDD and 17.8 mg (0.124 mmol)CuBr. The flask was sealed with a rubber septum and degassed and refilled with nitrogen for three times. Deoxygenated acetone (4 mL) was added into the flask followed by the addition of 26 μL (0.124 mmol) PMDETA via syringe. The mixture was sonicated for 15 min to form a uniform dispersion. Then 4 mL (24.7 mmol) deoxygenated iso-butylmethacrylate was added into the flask via syringe, and the mixture was stirred for 5 min. Finally, 23.8 μL (0.247 mmol) TCE was added via syringe, and the flask was heated in a 60° C. oil bath for 24 h. The purification process of the product was the same as that described above.

Example 9

ATRP of Iso-BMA Initiated by TCE (PiBMA-2)

The polymerization procedures are the same as those described in example 8 except that no as-received UDD was involved. A comparison of reaction conditions and results of ATRP of iso-BMA monomer with Cl-based initiator in the absence and presence of as-received UDD is provided in Table 2, respectively.

TABLE 2

Conditions and results of ATRP of iso-BMA with Cl-based initiators in acetone$^a$

| Sample | [iso-BMA]:[I]$^c$ | $M_n$ | $M_w/M_n$ | Yield (%) |
|---|---|---|---|---|
| PiBMA-2 | 100:1 | 13,600 | 1.12 | 82.7 |
| c-PiBMA-2$^b$ | 100:1 | 11,900 | 1.11 | 84.0 |

$^a$At a catalyst ratio, [iso-BMA]:[CuBr]:[PMDETA], of 200:1:1 at 60° C. for 24 h.
$^b$In the presence of as-received UDD.
$^c$[I] = [TCE].

Example 10

Synthesis of UDD-poly(tert-butylmethacrylate) (UDD-PtBMA)

A 25-mL dried, round-bottom flask was charged with 0.2 g UDD-Cl and 23.8 mg (0.246 mmol) CuCl. The flask was sealed with a rubber septum and degassed and refilled with nitrogen for three times. Deoxygenated toluene (4 mL) was added into the flask followed by the addition of 51.4 μL (0.246 mmol) PMDETA via syringe. The mixture was sonicated for 15 min to form a uniform dispersion. After the addition of 4 mL (24.6 mmol) deoxygenated tert-butylmethacrylate via syringe, the flask was heated in a 90° C. oil bath for 24 h. The purification process of the UDD-PtBMA product was the same as that described above.

Example 11

ATRP of tert-BMA in the Presence of as-Received UDD (c-UDD-3/c-PtBMA)

A 25-mL dried, round-bottom flask was charged with 0.20 g of as-received UDD and 23.8 mg (0.246 mmol) CuCl. The flask was sealed with a rubber septum and degassed and refilled with nitrogen for three times. Deoxygenated toluene (4 mL) was added into the flask followed by the addition of 51.4 μL (0.246 mmol) PMDETA via syringe. The mixture was sonicated for 15 min to form a uniform dispersion. Then 4 mL (24.6 mmol) deoxygenated tert-butylmethacrylate was added into the flask via syringe, and the mixture was stirred for 5 min. Finally, 23.7 μL (0.246 mmol) TCE was added via syringe, and the flask was heated in a 90° C. oil bath for 24 h. The purification process of the product was the same as that described above.

Example 12

ATRP of tert-BMA Initiated by TCE (PtBMA)

The polymerization procedures are the same as those described above except that no as-received UDD was involved. A comparison of reaction conditions and results of ATRP of tert-BMA monomer with Cl-based initiator in the absence and presence of as-received UDD is provided in Table 3, respectively.

TABLE 3

Conditions and results of ATRP of tert-BMA in toluene[a]

| Sample | [Tert-BMA]:[I][c] | $M_n$ | $M_w/M_n$ | Yield (%) |
|---|---|---|---|---|
| PtBMA | 100:1 | 12,600 | 1.17 | 95 |
| c-PtBMA[b] | 100:1 | 12,700 | 1.16 | 92 |

[a]At a catalyst ratio, [tert-BMA]:[CuCl]:[PMDETA], of 100:1:1 at 90° C. for 21 h.
[b]In the presence of as-received UDD.
[c][I] = [TCE].

Example 13

Preparation of UDD-poly(methacrylic acid) (UDD-PMAA)

Hydrophilic poly(methacrylic acid) brushes on the surface of UDD were obtained by acidic hydrolysis of PtBMA chains in the UDD-PtBMA sample. Typically, 226 mg UDD-Pt-BMA was dispersed into 30 mL $CHCl_3$ in a 100 mL flask by sonification, and 10 mL $CF_3CO_2H$ was added afterward. The mixture was stirred at room temperature for 24 h under nitrogen protection. The solvent was removed by rotary evaporation to collect UDD-PMAA powder and the product was dried in vacuum at room temperature for 16 h.

Example 14

Cleavage of poly(iso-butylmethacrylate) from UDD-PiBMA-2

The cleavage reaction was performed by dispersing 100 mg UDD-PiBMA-2 into 50 mL toluene followed by adding 100 mL iso-butanol and 5 mL concentrated sulfuric acid and refluxing the mixture at 100° C. for seven days. Solvent and reagents were removed by rotary evaporation at reduced pressure. The residual solid was dispersed into 100 mL $CHCl_3$ and extracted with water three times to remove sulfuric acid. The organic dispersion was filtered through a 0.2 μm millipore nylon membrane and washed with $CHCl_3$. The filtrate was dried via rotary evaporation, and the product of cleaved polymer was dried in vacuum at 40° C. for 16 h. Molecular weight and polydispersity of the cleaved PiBMA were obtained by GPC: $M_n$=78,400; $M_w/M_n$=2.47.

Figure 1:
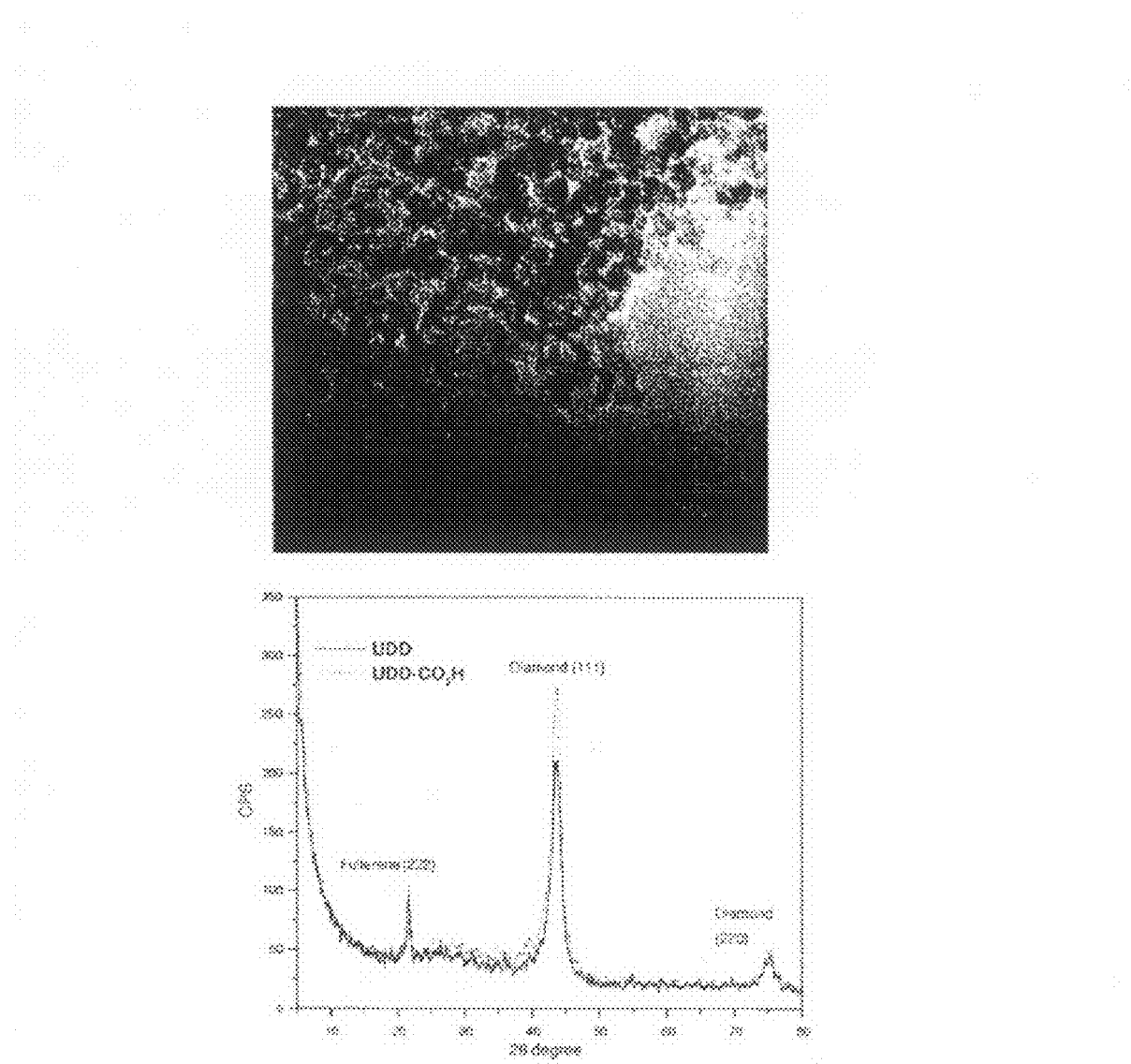
FIGS. 1, 3 and 34 are TEM images of various embodiments of the invention.

Ultradispersed diamond (UDD), used in this study and prepared by a proprietary detonation process, consists of diamond nanoparticles coated by a graphitic or onion-like matrix. TEM micrographs (see FIG. 1) reveal primary diamond nanoparticles 2-50 nm in size of average diameter below 10 nm. Visualization of the graphic matrix is evident but in much poorer contrast.

Nanodiamond/graphite aggregates ranging in size from 50 nm to 20 μm are present as the predominant particulate phase. XRD scans of UDD powder and of UDD oxidized by nitric acid, $UDD-CO_2H$, (see FIG. 1) reveal diffraction peaks near 44° in 2θ and 75° in 2θ as expected for nanocrystalline diamond. A reflection near 210 degrees in 2θ represents diffraction from the surrounding fullerene-like graphitic phase. Upon oxidation, graphene material is selectively etched away noticeably reducing the intensity of the graphene diffraction peak relative to that of the diamond (111) peak. Oxidative etching of extraneous graphene material also reduces the BET specific surface area of 131 $m^2/g$ for as-received UDD powder to 122 $m^2/g$ for $UDD-CO_2H$ and introduces reactive surface-bound carboxylic acid groups suitable for subsequent surface derivatization.

Figure 20:
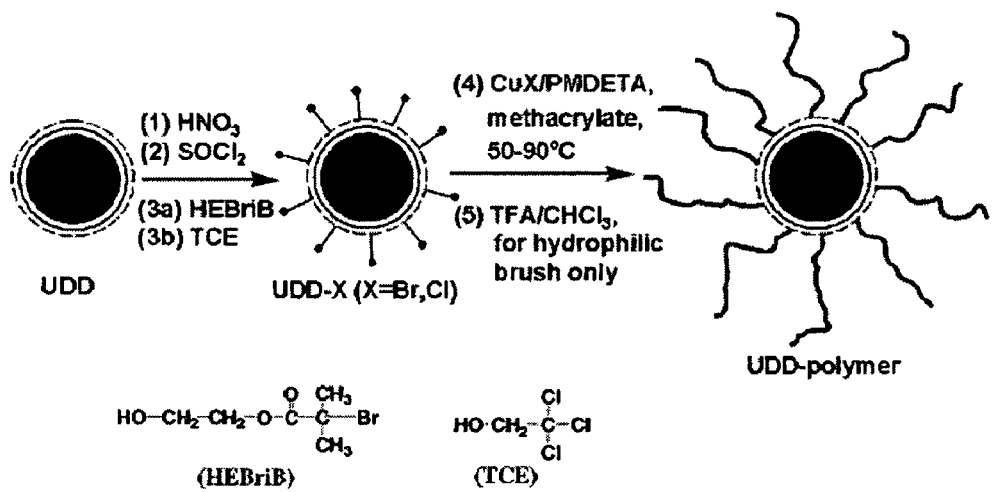

As shown in FIGS. 2 and 20, sequential reaction of surface $CO_2H$ groups with thionyl chloride and either HEBriB or TCE covalently binds two different ATRP initiators, UDD-Br, 1, and UDD-Cl, 2, onto UDD surface sites via ester linkages. From the halide content of 1 and 2 and the known surface area of oxidized UDD material, the surface density of initiator molecules is estimated to be 50 molecules/100 $nm^2$ for UDD-Br and 39 molecules/100 $nm^2$ for UDD-Cl. In situ ATRP of iso-butylmethacrylate or tert-butylmethacrylate monomers from the grafted initiators 1 (UDD-Br) or 2 (UDD-Cl) using the "grafting-from" method gives the corresponding UDD/polymer brushes 1a, 2a, and 2b as examples of UDD/polymer brush materials.

ATRP is effected at elevated temperatures using the monomer of choice in solution phase with Cu/Cl or CuBr/PM-DETA (N,N,N',N",N"pentamethyldiethylenetriamine) as catalyst. Typical reaction conditions are provided in Table 4 along with the extent of polymer incorporation. ATRP control reactions of (1) free initiator with monomer, and, (2) free initiator and monomer in the presence of as-received UDD reveal no significant radical trapping due to the presence of ungrafted UDD powder. Within these pairs of control reactions for the monomers used in this study, $M_n$ values differed by no more than 14% (ranging from 11,900-13,600) and polydispersity differed by no more than 0.02 (ranging from 1.11-1.17). Polymer yields ranged from 80% to 95% for these control reactions. Acid hydrolysis of polymer brush 2b affords polymer brush 2c containing water-soluble carboxylic acid groups.

TABLE 4

Typical ATRP reaction conditions and polymer content

| UDD Brush | [Monomer]:[I][a] | Catalyst ratio[b] | T (° C.) | t (h) | Polymer (wt. %)[c] |
|---|---|---|---|---|---|
| UDD-PiBMA-1 | 1100:1 | 200:1:1 | 50 | 22 | 65 |
| UDD-PiBMA-2 | 1500:1 | 200:1:1 | 60 | 24 | 45 |
| UDD-PtBMA | 1500:1 | 100:1:1 | 90 | 24 | 18 |

[a]Molarity of immobilized initiator calculated by (wt UDD-Br or UDD-Cl × 0.11 or 0.08 mmol/g, respectively).
[b]Catalyst ratio = [monomer]:[CuX]:[PMDETA].
[c]Obtained from TGA analysis.

Figure 3:
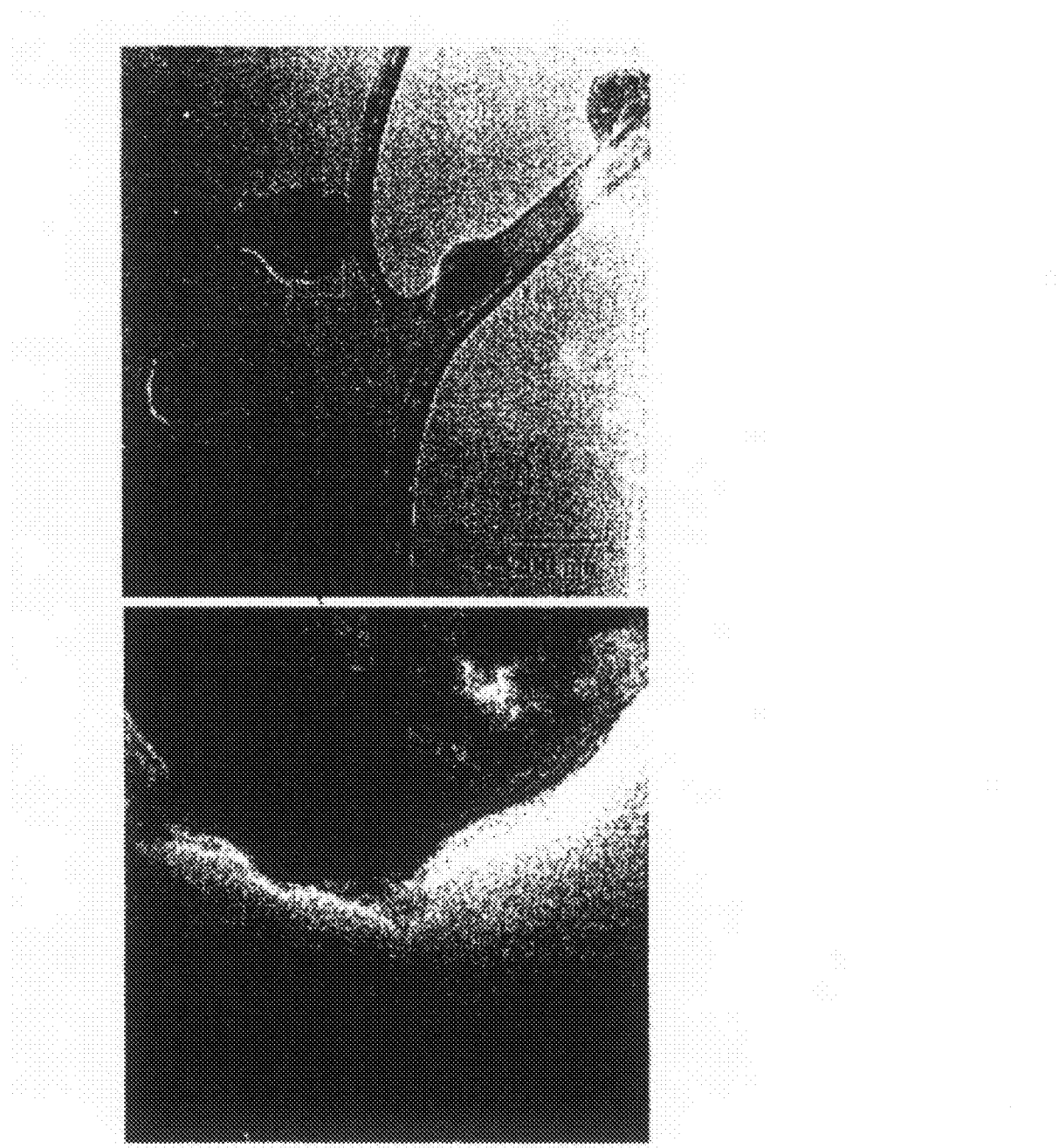
Figure 4:
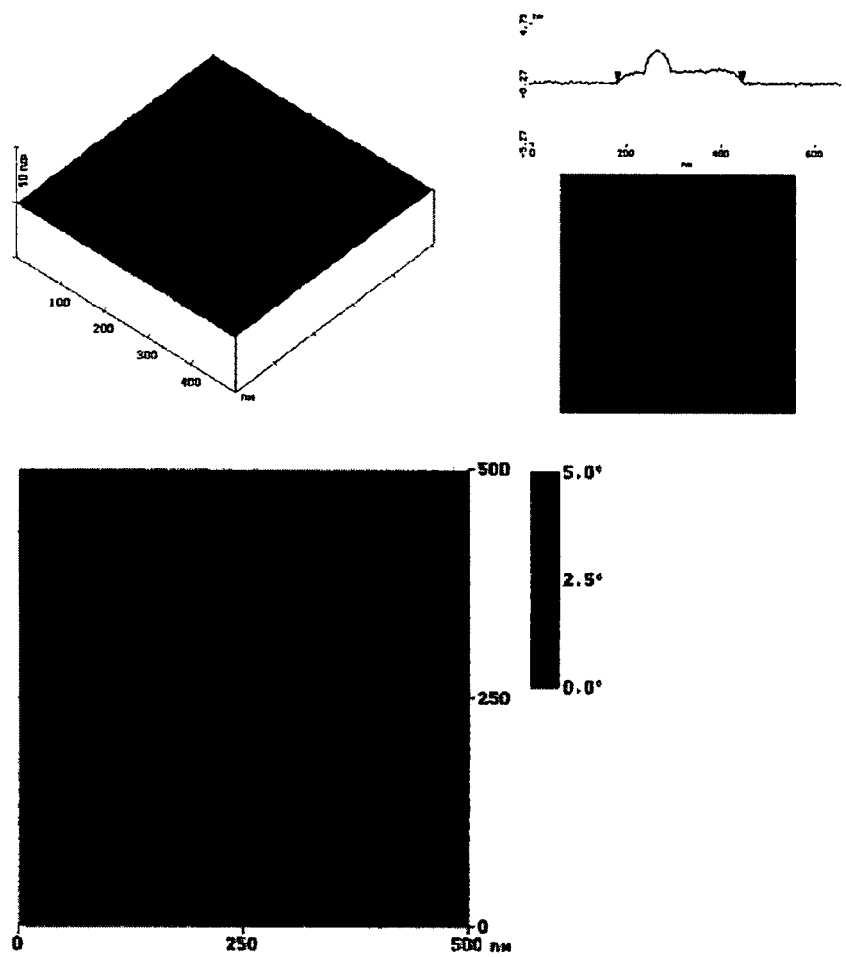
FIGS. 4, 27 and 33 are AFM images of various embodiments of the invention.

TEM micrographs of UDD/polymer brushes reveal UDD aggregates coated by polymer, though contrast is poor for such low-Z materials (see FIG. 3). Complementary AFM images (FIG. 4) reveal a polymer layer phase extending ca. 40-150 nm from the UDD aggregate surface. PiBMA molecules cleaved from UDD/polymer brush 2a have a number-average molecular weight of 78,400 consistent with the observed polymer layer thickness. Local-site variations in the rate of ATRP chain growth gives a distribution of polymer chain lengths, as evidenced by a polydispersity of 2.47. MWNT-PS brushes, also prepared via surface-initiated ATRP, have a similarly large polydispersity of 3.08.

Figure 5:
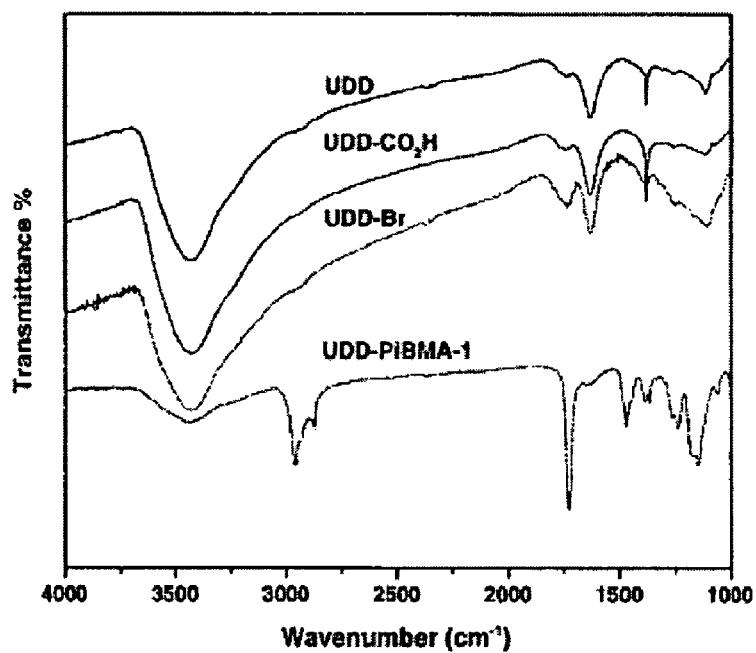
FIGS. 5, 9-11, 25, 30 and 36 are FT-IR images of various embodiments of the invention.

Representative FT-IR spectra of UDD, oxidized UDD (UDD-CO$_2$H), initiator-bound UDD, 1 (UDD-Br), and UDD-PiBMA-1 polymer brush 1a are shown in FIG. 5. Bands observed at 3450 cm$^{-1}$ and 1737 cm$^{-1}$ for UDD-CO$_2$H and 1 are assigned to O—H and carboxyl group C═O stretching bands resulting from UDD surface oxidation by nitric acid. The presence of additional carboxyl groups within the surface-bound initiator molecules of 1 augments the relative intensity of the carboxyl C═O stretching band. IR spectra of UDD/polymer brushes are dominated by bands associated the polymer chains. Intense bands at 1731 cm$^{-1}$ and 1160 cm$^{-1}$ for 1a are assigned to C═O and C—O stretching bands of the ester functional groups within poly(methacrylate) chains. Analogous bands are also observed in the IR spectra of UDD/polymer brushes 2a and 2b, while the carboxyl C═O stretching band shifts to 1684 cm$^{-1}$ for the UDD-(poly-methacrylic acid) brush, 2c. All three UDD/polymer brushes show bands in the range 2870-2960 cm$^{-1}$ for C—H stretching modes. Similar IR bands have been observed in analogous SWNT or MWNT/poly(acrylate) ester brushes.

Figure 6:
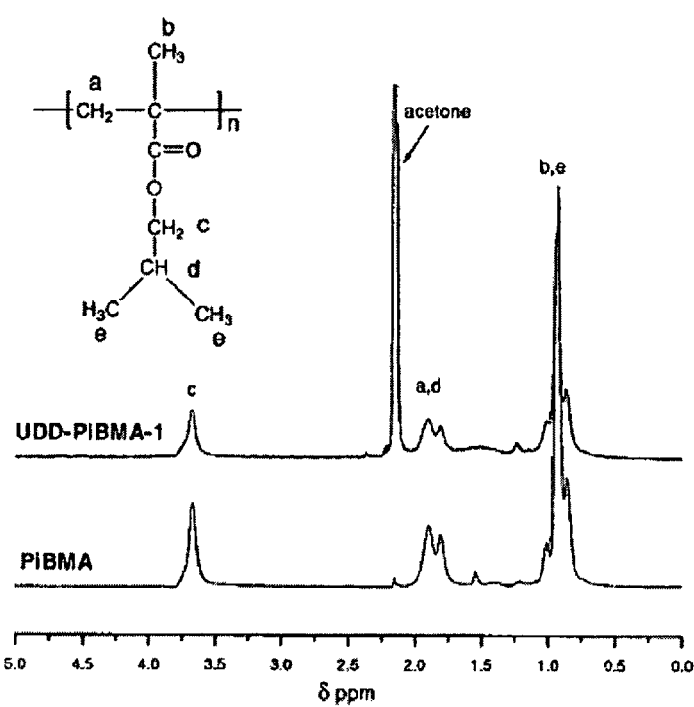
FIGS. 6 and 32 are 1H-NMR images of various embodiments of the invention.

$^1$H-NMR spectra of UDD-PiBMA-1 1a and of PiBMA pure polymer are shown in FIG. 6. Resonances observed at 0.93 ppm, 1.81 ppm, 1.89 ppm and 3.67 ppm for the UDD/polymer brush are readily assigned to the corresponding resonances of the analogous free polymer. Only a small degree of relaxation broadening is observed for the UDD/polymer brush indicating good extension of the polymer chains into the solution phase. $^1$H-NMR spectra of similar resolution have been reported for SWNT/poly(n-butyl methacrylate) brushes.

Figure 7:
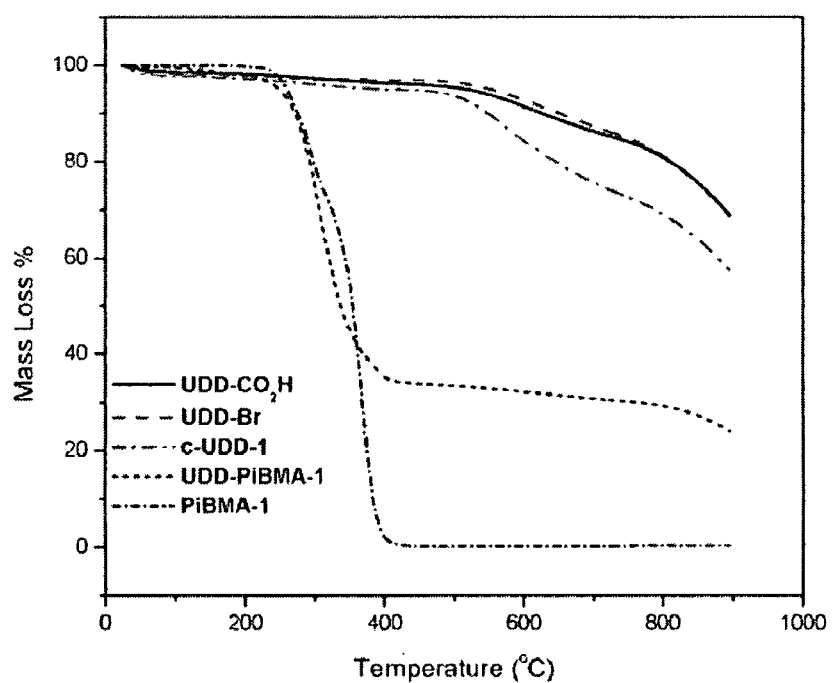
Figure 9:
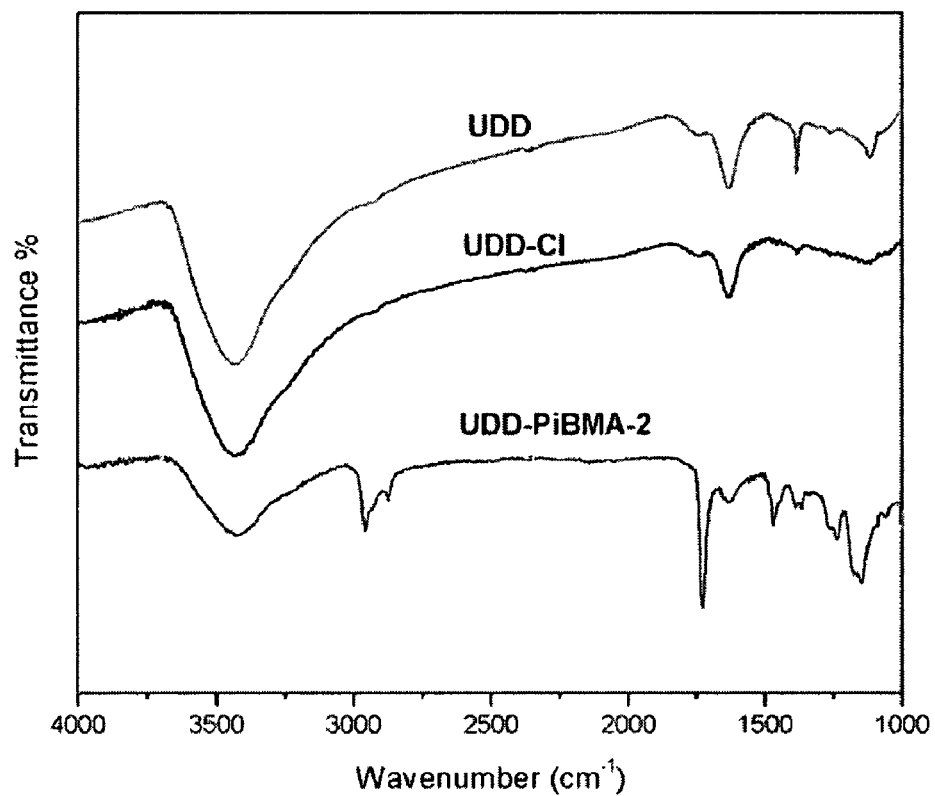
Figure 10:
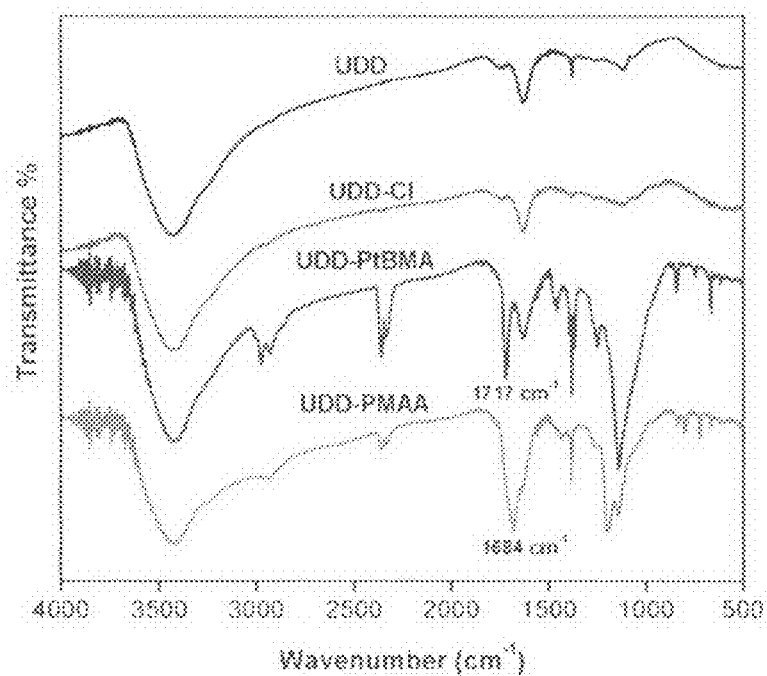
Figure 11:
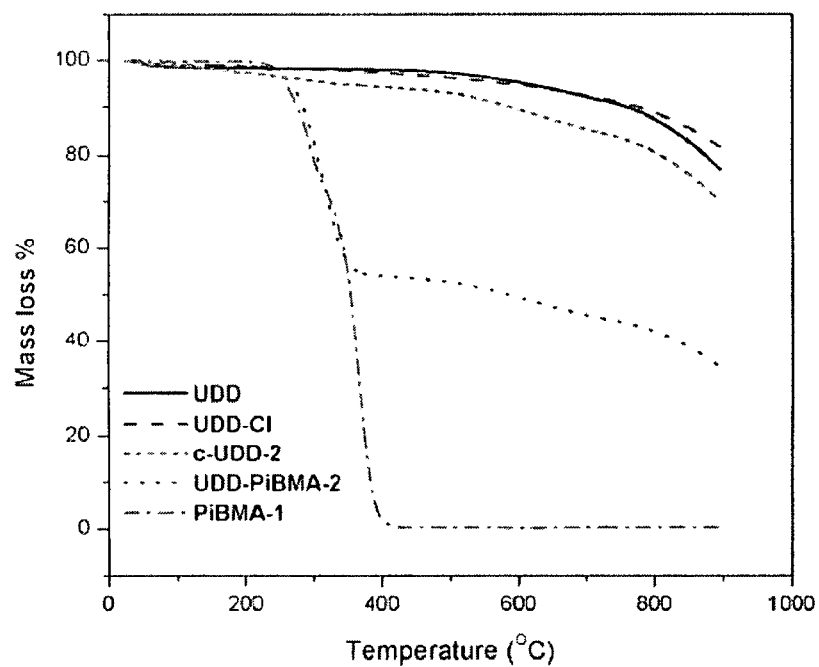
Figure 12:
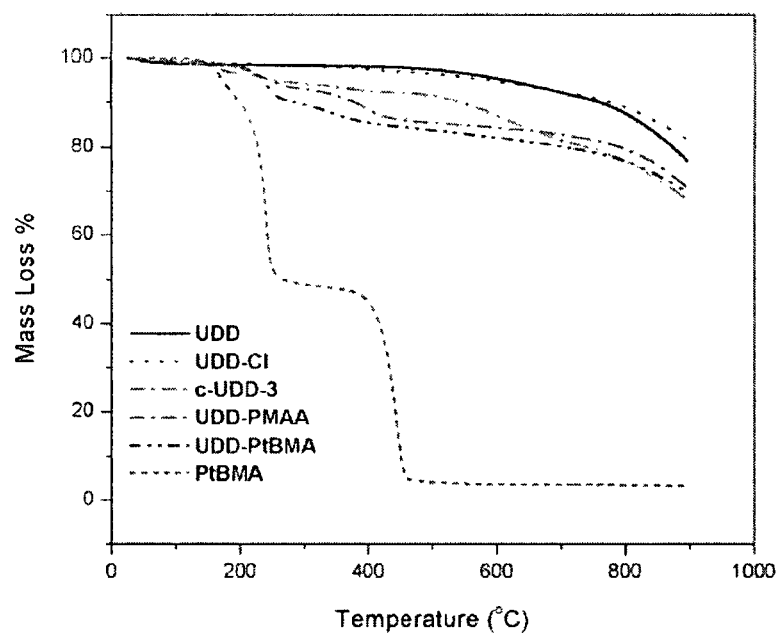
Figure 13:
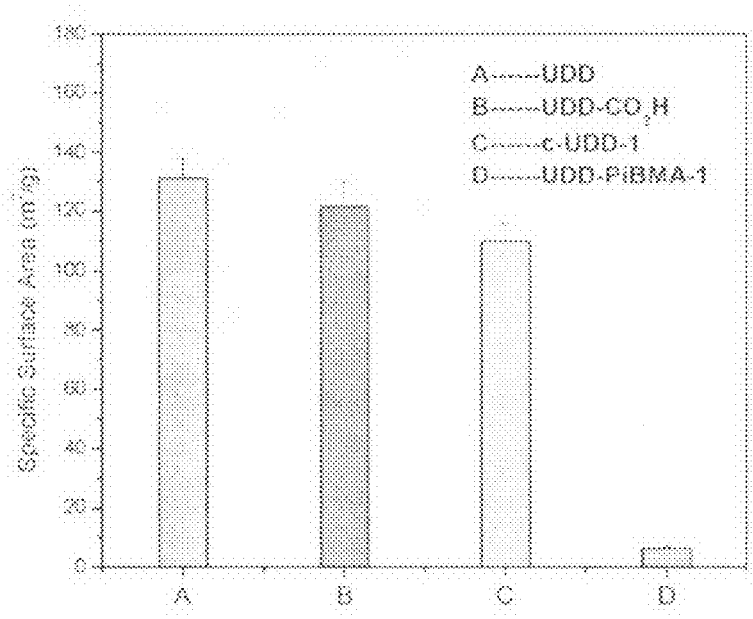
FIGS. 13-15 and 37 depict BET analyses of various embodiments of the invention.
Figure 14:
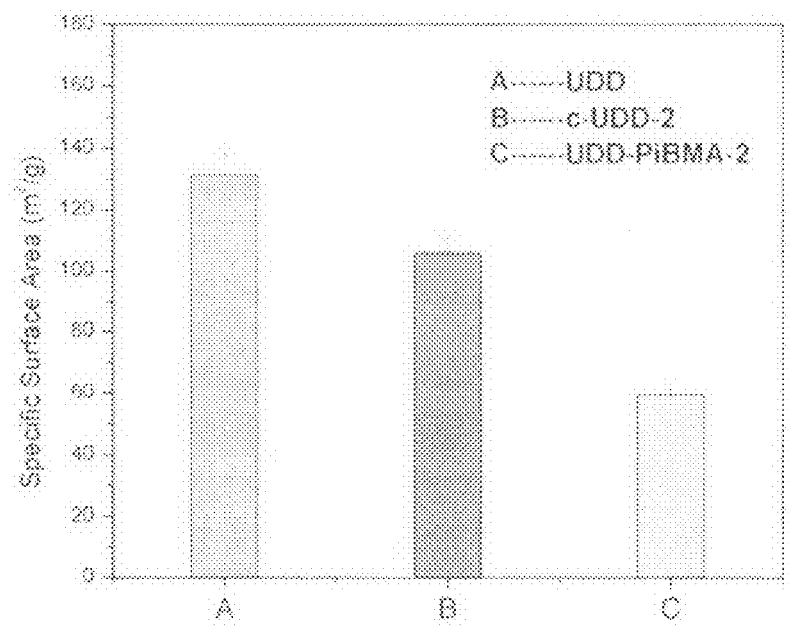
Figure 15:
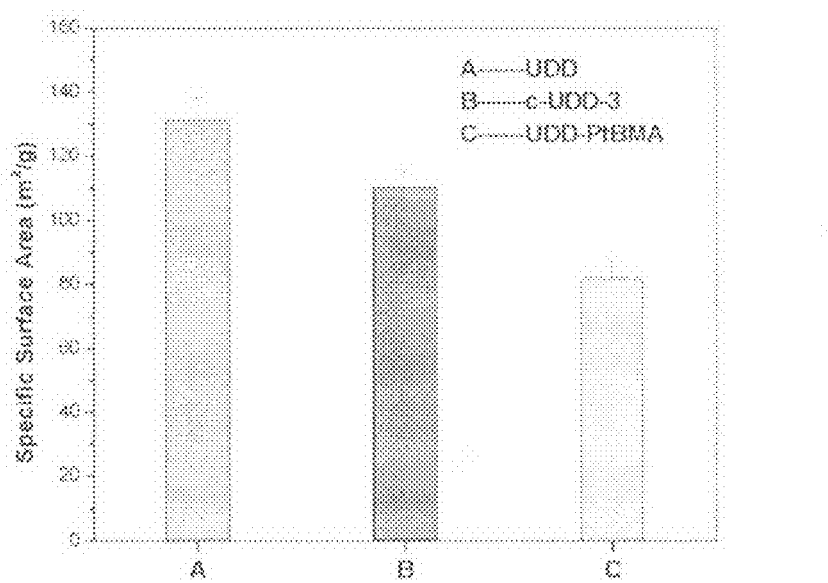
Figure 16:
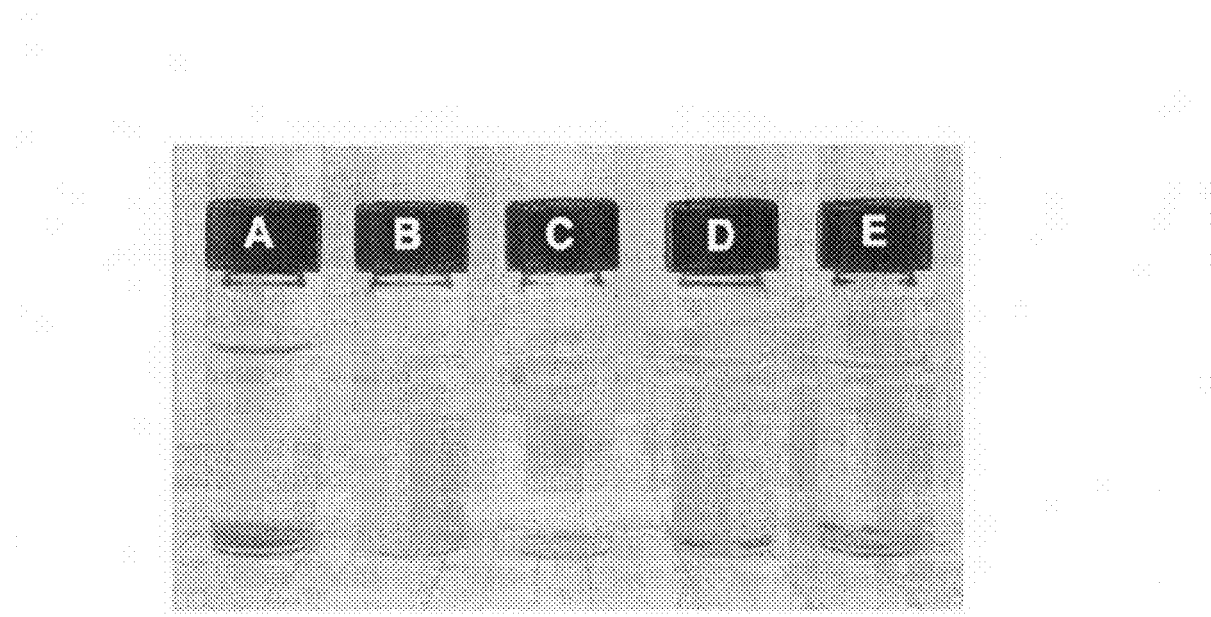
Figure 17:
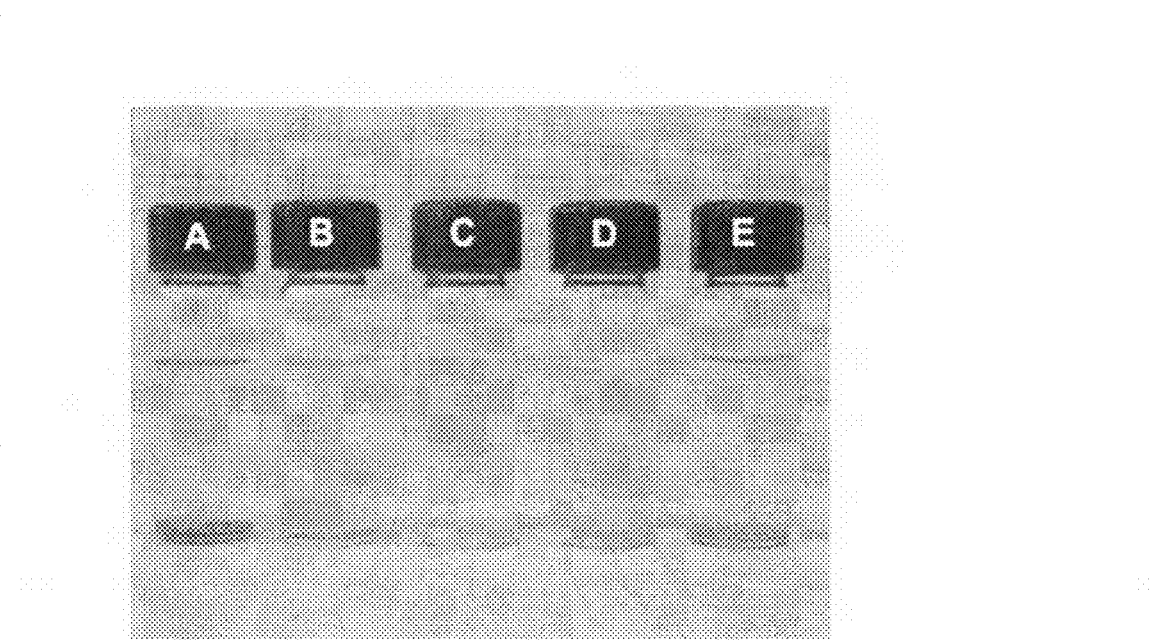

TGA mass-loss curves for UDD/polymer brush 1a and related intermediate materials are shown in FIG. 7. Oxidized UDD and initiator-bound UDD, UDD-Br, undergo a similar, gradual 30 wt. % mass-loss event from ca. 500-900° C. attributed to decarboxylation, decarbonylation, and dehydration of surface-bound oxyhydrocarbyl groups, including CO$_2$H functional groups and initiator molecules. With an initiator molecule content for UDD-Br estimated to be only 2.6 wt. % based on elemental analysis, observation of a distinct mass-loss event for degradation of the linker molecule component is not expected. In contrast, thermal decomposition of the UDD-PiBMA-1 polymer brush occurs as a single, mass-loss event centered near 330° C. due to the high polymer content of this material. This event parallels that observed for pure PiMBA and is clearly associated with the thermal decomposition of surface-bound PiMBA polymer chains.

As shown in FIG. 8, the solution dispersibility of UDD-polymer brushes is controlled by the solubility properties of the polymer chain. UDD/polymer brushes containing ester functional groups, such as 2b, are hydrophobic, while the hydrophilic UDD/poly(methacrylic acid) brush 2c disperses in water. The excellent dispersibilities of these UDD/polymer brushes are attributed to the high degree of surface derivatization achieved by this method. From the BET surface-area of oxidized UDDs (122 m$^2$/g) and the average polymer chain content (3.4×10$^{18}$ chains/g) determined for UDD/polymer brush 2a, a surface density of ca. five polymer chains/100 nm$^2$ can be calculated.

UDD nanoparticles, surface-functionalized with ATRP initiator molecules, react with methacrylate esters to form UDD/polymer brushes. Both hydrophobic and hydrophilic UDD/polymer brushes can be prepared. By controlling the reactivity and dispersibility properties of the polymer brush component, a wide variety of UDD/polymer brush materials having controlled dispersibility and designed reactivity are now available.

Diamond/polymer, more particularly UDD/polymer, brushes may also be prepared by simply reacting and polymerizing an appropriate monomer(s) directly onto the diamond surface, as shown in the following examples.

Example 15

UDD-poly(glycidyl methacrylate) [UDD-PGMA]: Synthesis and Characterization

A 25 mL round-bottomed flask, with a magnetic stir bar, was charged with 43.4 mg (0.302 mmol) CuBr and 0.20 g UDD-Cl. The flask was sealed with a rubber septum and degassed and refilled with N$_2$ three times. Deoxygenated DPE (4 mL) was added into the flask followed by the addition of 63.6 μL (0.302 mmol) PMDETA via syringe. The mixture was sonicated for 15 min to form a uniform dispersion. After the addition of 4 mL (30.2 mmol) deoxygenated GMA via syringe, an initial sample was taken and the flask was placed into a 30° C. oil bath. Aliquots were removed after 1, 2, 4, and 6 h. After 24 h., the reaction mixture was quenched with liquid N$_2$ and diluted with THF. The mixture was centrifuged and washed with THF six times to remove ungrafted polymers. The solid product of UDD-PGMA was collected and dried in the vacuum oven overnight at room temperature.

ATRP of GMA in the presence of as-received UDD (c-UDD-1/c-PGMA-1): A 25 mL round-bottomed flask, with a magnetic stir bar, was charged with 21.7 mg (0.151 mmol) CuBr and 0.10 g as-received UDD. The flask was sealed with a rubber septum and degassed and refilled with N$_2$ three times. Deoxygenated DPE (4 mL) was added into the flask followed by the addition of 31.8 μL (0.151 mmol) PMDETA via syringe. Then 4 mL (30.2 mmol) deoxygenated GMA was added via syringe and the mixture was stirred for 5 min. Finally, 14.6 μL (0.151 mmol) TCE was added via syringe, and the flask was placed into a 30° C. oil bath for 4 h. The reaction mixture was quenched with liquid N$_2$ and THF was added to dilute the mixture. The product was washed with THF under sonication and centrifuged six times. The solid powder of UDD was collected and dried in the vacuum oven overnight at room temperature. The supernate from the sonication-centrifugation process was precipitated into excess hexane and the white powder of PGMA was collected and dried overnight in the vacuum oven at room temperature.

Poly(glycidyl methacrylate) polymer brushes have been synthesized on the surface of both flat wafers and polymer microspheres via ATRP with "grafting from" method. Different catalysts and media with various polarity were used to achieve controlled ATRP in these systems. In our work, controlled growth of PGMA polymer brushes from the surface of UDD was obtained by using surface-bound initiator, UDD-Cl, to carry out in situ ATRP of GMA in DPE solution at ambient temperature with CuBr/PMDETA as catalyst. As shown in Table 5, polymerizations with different monomer/initiator ratio and monomer/catalyst ratio were performed to investigate the effect of reaction conditions on the nature of the polymer brush controlled growth process. As to UDD-PGMA-1 and UDD-PGMA-2, although the monomer/catalyst ratio of the former was twice of that of the latter, the resulting polymer brush content in the product was almost the same given in the error range of the data obtained from TGA measurements. In contrast, polymerization time played an important role in polymer brush growth. Longer polymerization time, higher polymer brush content in the final product of UDD-PGMA when UDD-PGMA-3 and UDD-PGMA-2, which have the same polymerization conditions except the polymerization time, were compared.

TABLE 5

Experimental conditions of ATRP to prepare UDD-PGMA brushes

| Sample[a] | [GMA]:[UDD-Cl][b] | [GMA]:[I][c]:[L][d]:[CuBr] | Time (h) | Polymer wt %[e] |
|---|---|---|---|---|
| UDD-PGMA-1 | 2130:1 | 200:0:1:1 | 24 | 21 |
| UDD-PGMA-2 | 2070:1 | 100:1:1:1 | 24 | 19 |
| UDD-PGMA-3 | 1080:1 | 100:1.1:1 | 120 | 35 |

[a]All reactions were carried out at 30° C. in DPE (50%, v/v);
[b]Molarity of immobilized initiator calculated by (wt UDD-Cl × 0.14 mM/g). [I] = TCE;
[c][L] = [PMDETA];
[d]Obtained from TGA analysis.

Figure 24:
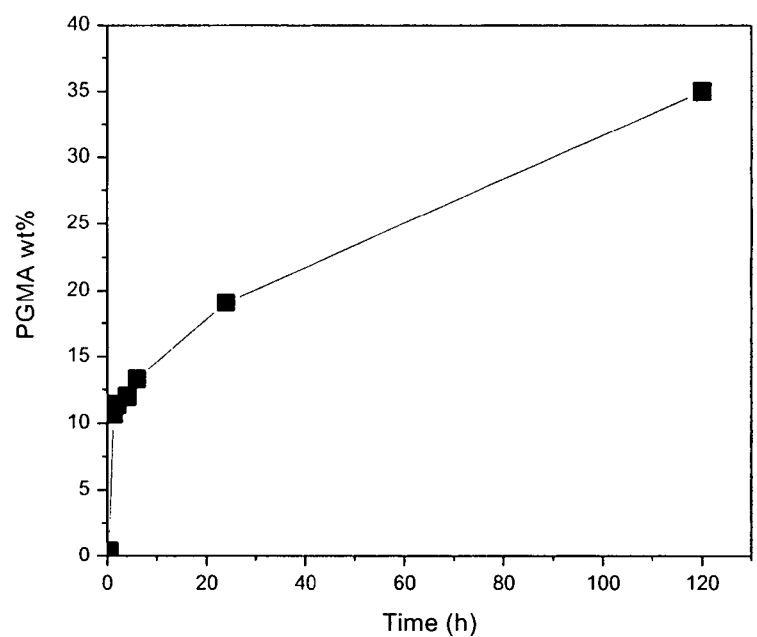

Kinetic plot of the polymer brush content as a function of polymerization time is shown in FIG. 24. The deviation of the plot from linear shape indicates that the growth of polymer brushes from the surface of UDD was not a real controlled polymerization process. However, our previous work on the controlled growth of other methacrylate polymer brushes on the surface of UDD has demonstrated that the real controlled polymerization is unnecessary in the UDD/polymer brushes system. Therefore, the polymerization conditions of ATRP of GMA in preparation of UDD-PGMA-3 was applied to synthesize a relatively large amount of UDD-PGMA polymer brushes for the application purpose of incorporating in epoxy resin as reinforcement additives to improve the mechanical properties of such nanocomposites.

Figure 25:
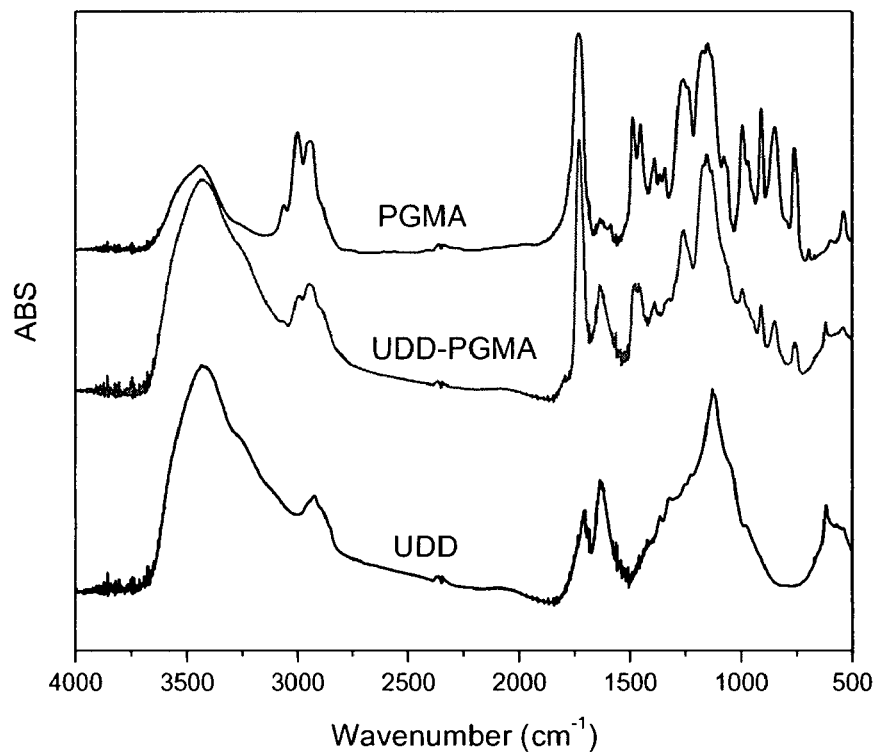

Representative FTIR spectra for as-received UDD, UDD-PGMA polymer brush and PGMA free polymer are shown in FIG. 25. Bands observed at 1737 cm$^{-1}$ and 1642 cm$^{-1}$ for UDD are assigned to carboxyl group C=O stretching of surface carboxylic groups and superposition of deformation vibration of OH of absorbed water and N—H and C—N stretching vibration, relatively, resulting from UDD surface oxidation by nitric acid. FTIR spectrum of UDD-PGMA polymer brush is dominated by bands associated the polymer chains. Intense band at 1730 cm$^{-1}$ for UDD-PGMA are assigned to C=O stretching bands of the ester functional groups within PGMA chains which are attributed to the polymer brush. FTIR spectra of UDD-PGMA and PGMA also show specific epoxide peak centered at 970 cm$^{-1}$, indicating the conditions of ATRP have no negative effect on the pendant epoxide groups in PGMA chains.

Figure 26:
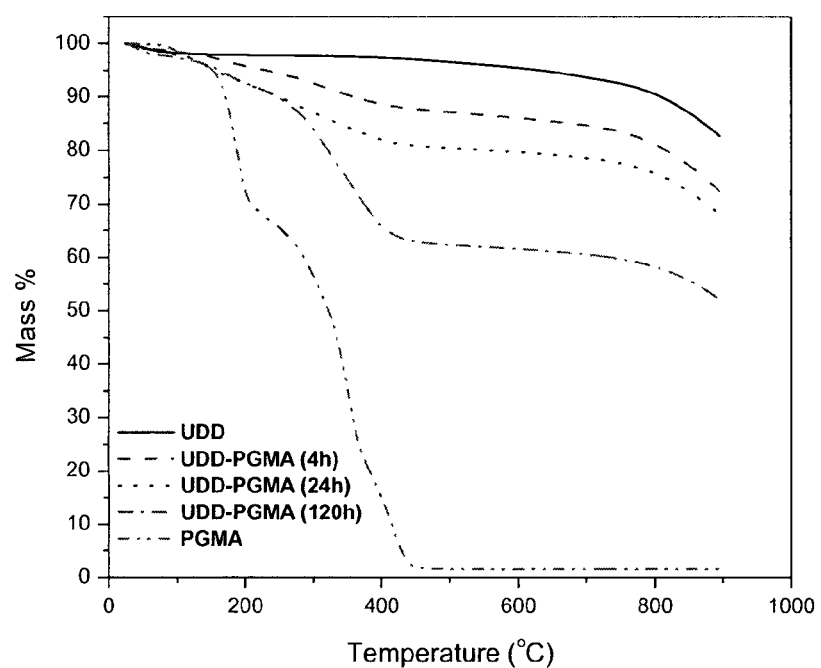

TGA mass-loss curves for UDD-PGMA polymer brush and related intermediate materials are illustrated in FIG. 26. As-received UDD undergoes a gradual 18 wt % mass-loss event from ca. 500° C.-900° C. attributed to decarboxylation, decarbonylation, and dehydration of surface-bound oxyhydrocarbyl groups, including $CO_2H$ functional groups and initiator molecules. In contrast, thermal decomposition of the UDD-PGMA polymer brush samples occurs as a mass-loss event from 100° C. to 450° C. due to the grafted polymer content of this material. This event parallels that observed for pure PGMA and is clearly associated with the thermal decomposition of surface-grafted PGMA polymer chains. The polymer brush content of the UDD-PGMA samples was determined by the TGA traces.

Figure 27:
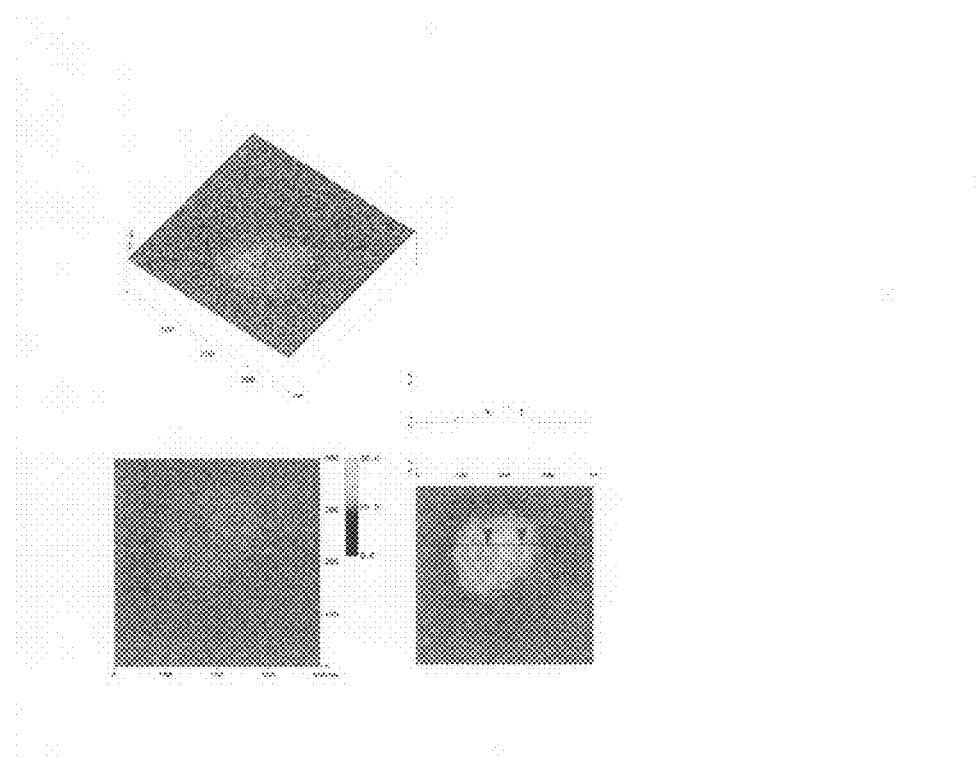

Direct observation of UDD-PGMA polymer brush was achieved by tapping mode AFM. The height and phase images of an individual UDD nanoparticle covered by grafted polymer brushes on a mica surface are shown in FIG. 27. The centered UDD nanoparticle has a diameter about 70 nm and the surrounding polymer brush chains extend from 50 nm to 100 nm indicating the broad distribution of the chain length of the grafted polymer chains.

Figure 28:
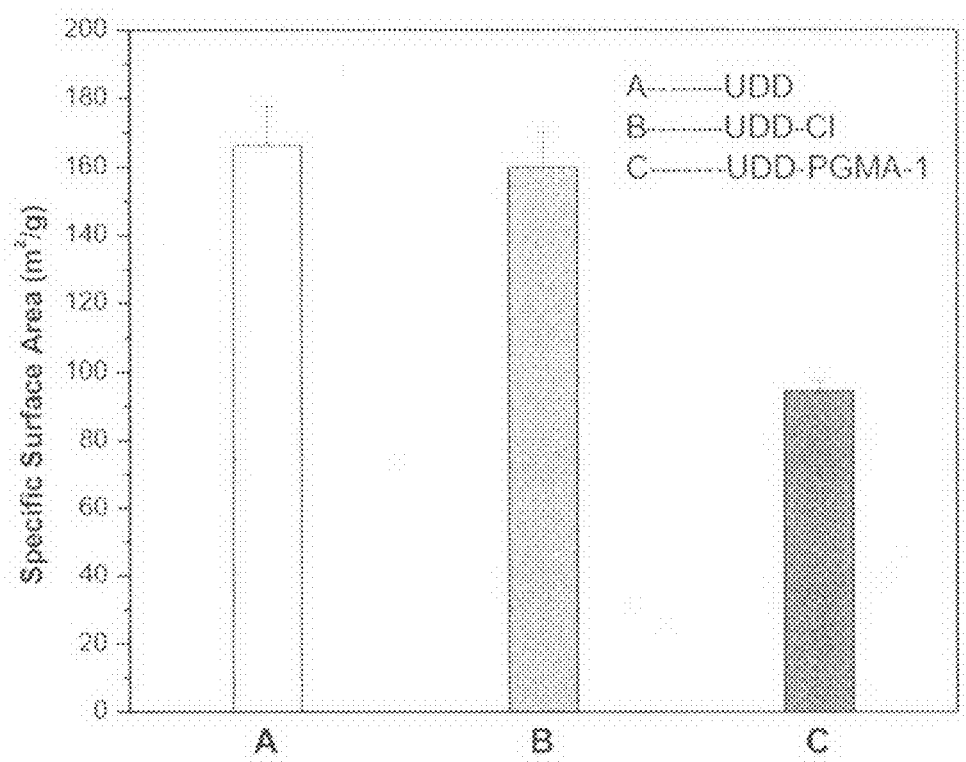

Since the rough UDD surface of UDD-PGMA are covered by relatively smooth polymer brush layers, the specific surface area of UDD-PGMA is expected to decrease compared with its precursors of as-received UDD and initiator-bound UDD, UDD-Cl. As shown in FIG. 28, as-received UDD and UDD-Cl have specific surface area of 166.2 m$^2$/g and 160.0 m$^2$/g, respectively, while UDD-PGMA-1 has only 94.4 m$^2$/g.

Example 16

UDD-poly(octadecyl methacrylate) [UDD-POMA]: Synthesis and Characterization

A 25 mL round-bottomed flask, with a magnetic stir bar, was charged with 20 mg (0.2 mmol) CuCl and 0.2 g UDD-Cl. The flask was sealed with a rubber septum and degassed and refilled with $N_2$ three times. Deoxygenated acetone (4 mL) was added into the flask followed by the addition of 42 μL (0.2 mmol) PMDETA via syringe. The mixture was sonicated for 15 min to form a uniform dispersion. After the addition of 4 mL (20 mmol)deoxygenated OMA via syringe, an initial sample was taken and the flask was placed into a 90° C. oil bath. Aliquots were removed after 1, 2, 4, and 6 h. After 24 h., the reaction mixture was quenched with liquid $N_2$ and diluted with THF. The mixture was centrifuged and washed with THF six times to remove ungrafted polymers. Then the solid residue was dispersed in THF and precipitated into excess methanol to remove catalyst. By filtering through a 0.45 μm Millipore Nylon membrane, the solid product of UDD-POMA was collected and dried in the vacuum oven overnight at room temperature. The ungrafted polymers were purified by precipitating the supernate from the centrifugation process into excess methanol. The obtained polymers were then filtered and dried in vacuum at room temperature.

ATRP of OMA in the presence of as-received UDD (c-UDD-1/c-POMA-1): A 25 mL round-bottomed flask, with a magnetic stir bar, was charged with 20 mg (0.2 mmol) CuCl and 0.20 g as-received UDD. The flask was sealed with a rubber septum and degassed and refilled with $N_2$ three times. Deoxygenated acetone (4 mL) was added into the flask followed by the addition of 42 μL (0.2 mmol) PMDETA via syringe. Then 7.8 mL (20 mmol) deoxygenated OMA was added via syringe and the mixture was stirred for 5 min. Finally, 19.3 μL TCE was added via syringe, and the flask was placed into a 90° C. oil bath for 24 h The reaction mixture was quenched with liquid $N_2$ and THF was added to dilute the mixture. The product was washed with THF under sonication and centrifuged six times. Afterward, the UDD residue was dispersed in 15 mL THF and precipitated into 200 mL methanol to remove catalyst. By filtering through a 0.45 μm Millipore Nylon membrane, the solid powder of UDD was collected and dried in the vacuum oven overnight at room temperature. The supernate from the sonication-centrifugation process was precipitated into excess methanol and the white powder of POMA was collected and dried overnight in the vacuum oven at room temperature.

As previously discussed, the as-received UDD nanoparticles have reactive functional groups such as carboxylic acid groups on the surface resulting from the oxidative etching of the graphitic or onion-like layers with nitric acid during the purification process. Sequential reactions of acylation with thionyl chloride and esterification with TCE were performed to immobilize the ATRP initiator molecules on the surface of UDD nanoparticles. Surface density of the immobilized initiator molecules was estimated to be 69 molecules/100 nm$^2$ based on the elemental analysis and BET specific surface area analysis.

Syntheses of well defined homopolymers and copolymers of octadecyl methacrylate (OMA) using ATRP have been reported. Due to the hydrophobic nature of long alkyl side chain of OMA, a nonpolar solvent, o-xylene, and a hydrophobically modified bipyridine ligand, 4,4'-di(5-nonyl)-2,2'-bipyridine, were applied to improve the homogeneity of the reaction mixture of ATRP. Halogen exchange technique was also used to improve the control of the polymerization. In this work, in situ ATRP of OMA from the surface-bound initiators, UDD-Cl, was carried out to grow polymer brushes on the UDD surface with a "grafting-from" method.

As shown in Table 6, ATRP of OMA for UDD-POMA-1 was performed in o-xylene media at elevated temperature with CuCl/PMDETA as catalyst. For an ideal living brush growth polymerization, the kinetic plot of polymer brush content as a function of polymerization time is linear.

between the small amount of surface-bound initiators and the relatively large number of unbound initiators.

To verify the polymer brushes were grafted from the UDD surface instead of being grafted onto the surface by free polymers formed in solution, two control reactions of (1) OMA monomer with free initiator TCE and, (2) OMA monomer without initiator, in the presence of as-received UDD were carried out in the identical conditions as that of UDD-POMA-1. No significant polymer brushes were observed on the surface of c-UDD-1 and the molecular weight and polydispersity of the free polymers c-POMA-1 obtained in the control polymerization (1) reveal no significant radical trapping due to the presence of ungrafted UDD powder. Neither polymer brushes and free polymers were observed in the control polymerization (2), indicating the polymer brushes of UDD-POMA-1 were unlikely formed by grafting thermal initiated polymers onto the surface of UDD.

Figure 30:
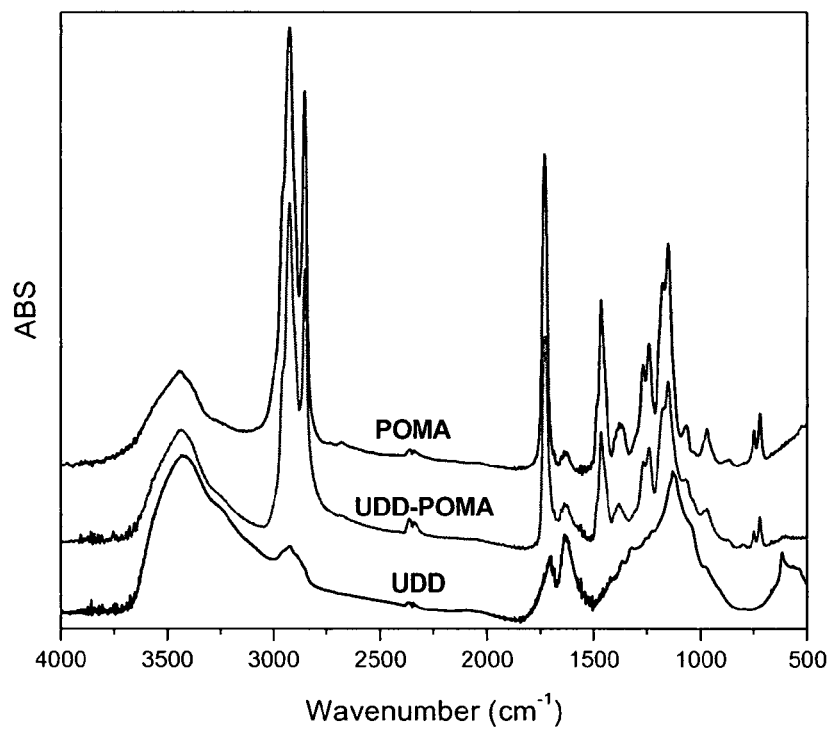

Representative FTIR spectra for as-received UDD, UDD-POMA polymer brush and UDD free polymer are shown in FIG. 30. Bands observed at 3450 cm$^{-1}$ and 1737 cm$^{-1}$ for UDD are assigned to O—H and carboxyl group C=O stretching bands resulting from UDD surface oxidation by nitric acid. FTIR spectrum of UDD-POMA polymer brush is dominated by bands associated the polymer chains. Intense

TABLE 6

Experimental conditions of ATRP to prepare UDD-POMA polymer brushes

| Sample | [OMA]:[UDD-Cl][c] | [OMA]:[I][d]:[L][e]:[CuCl]:[CuCl$_2$] | Time (h) | Polymer wt %[f] |
|---|---|---|---|---|
| UDD-POMA-1[a] | 710:1 | 100:0:1:1:0 | 24 | 55 |
| UDD-POMA-2[a] | 710:1 | 100:0:1:1:0.1 | 24 | 65 |
| UDD-POMA-3[a] | 710:1 | 100:1:1.1:1 | 24 | 15 |
| UDD-POMA-4[b] | 710:1 | 100:1:1:0 | 96 | 20 |

[a]Reactions were carried out at 90° C. in o-xylene (50% v/v);
[b]Reaction was carried out at 90° C. in o-xylene (27% v/v);
[c]Molarity of immobilized initiator calculated by (wt UDD-Cl × 0.14 mM/g);
[d][I] = TCE;
[e][L] = [PMDETA];
[f]Obtained from TGA analysis.

Figure 29:
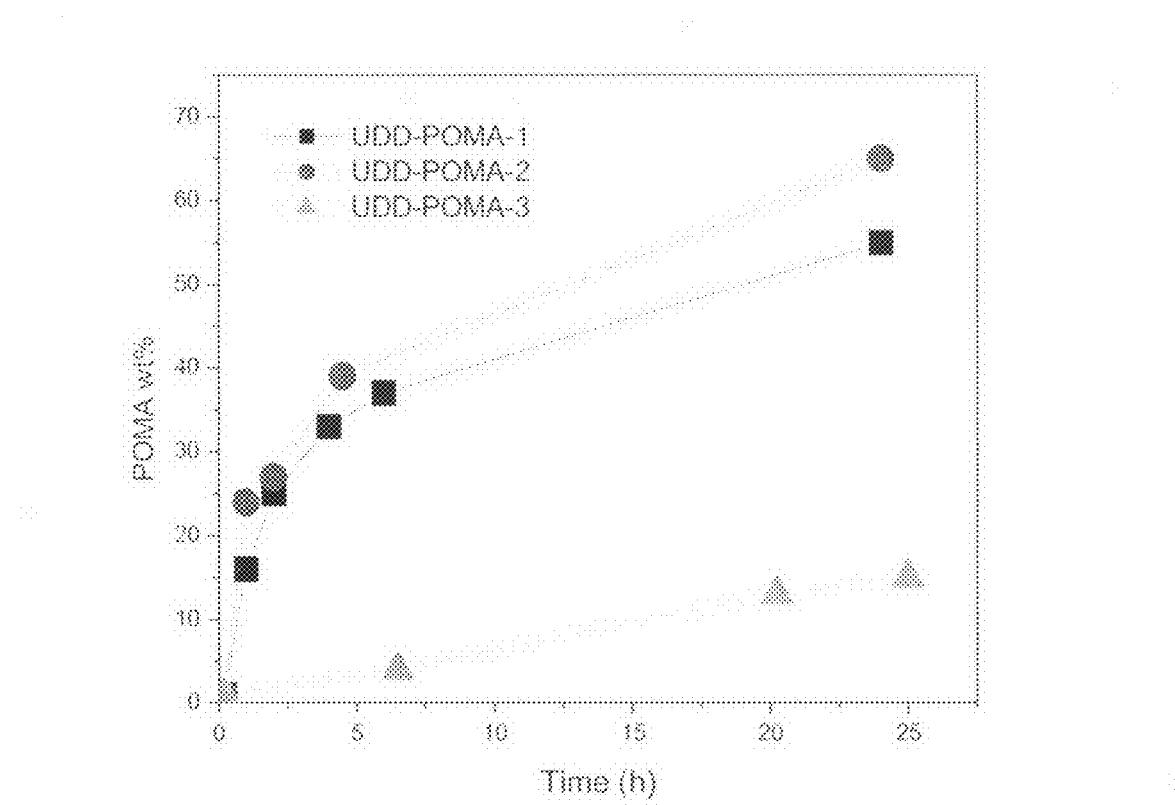

However, the increase of polymer brush content slows down with time in the UDD-POMA-1 kinetic plot (FIG. 29), indicating the polymer brush growth process of is not a controlled polymerization as expected. The critical requirement in ATRP is an adequate concentration of deactivator at the beginning stage of initiation to establish effective exchange reactions between reactive radicals and dormant halides. In the surface-initiated polymerization, the low concentration of surface-bound initiators limits the creation of sufficient deactivators for polymerization control. In order to suppress this disadvantage, two experiments were conducted to improve the control of the surface-initiated ATRP of OMA: a) an appropriate amount of CuCl$_2$ was added as the deactivator with a concentration of 10 mol % to CuCl at the beginning of the polymerization (Table 1, UDD-POMA-2); b) sacrificial initiator TCE was added and the polymerization was simultaneously initiated by both surface-bound and unbound initiators (Table 6, UDD-POMA-3). Addition of CuCl$_2$ increased the polymerization rate slightly but the polymerization was still in poor control. On the other hand, when the sacrificial initiator was added in the polymerization system, the polymerization was in good control throughout the timescale of the polymerization as the linear shape of the polymer brush content as a function of polymerization time indicates in FIG. 29. However, the polymerization rate of UDD-POMA-3 was dramatically reduced due to the competition band at 1730 cm$^{-1}$ for UDD-POMA are assigned to C=O stretching bands of the ester functional groups within POMA chains which are attributed to the polymer brush. FTIR spectra of UDD-POMA and POMA also show strong bands centered at 2930 cm$^{-1}$ and 2850 cm$^{-1}$ for C—H stretching modes.

Figure 31:
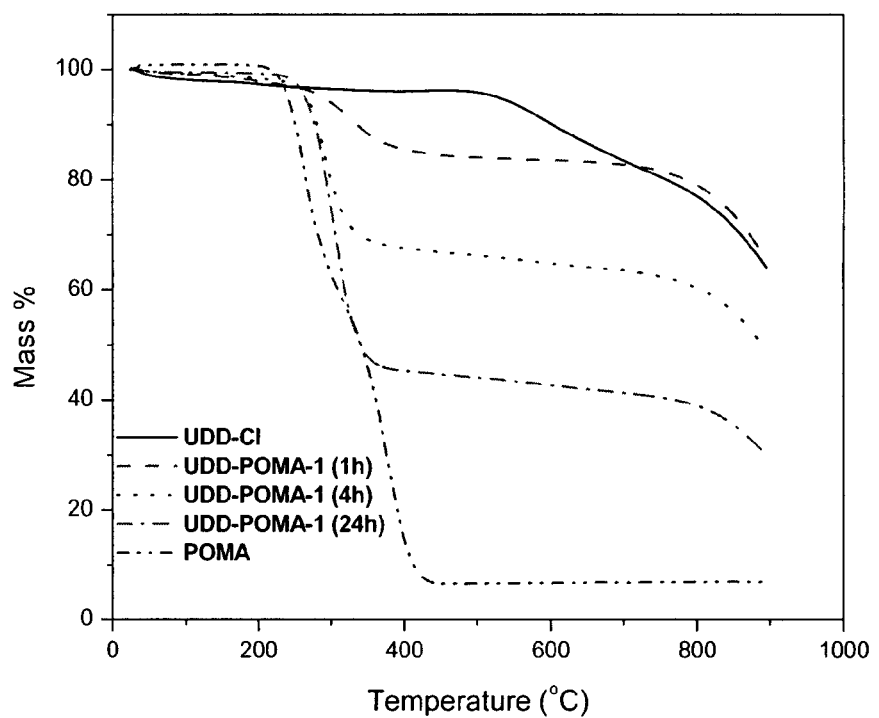

TGA mass-loss curves for UDD-POMA polymer brush and related intermediate materials are illustrated in FIG. 31. Initiator-bound UDD, UDD-Cl, undergoes a gradual 35 wt % mass-loss event from ca. 500° C.-900° C. attributed to decarboxylation, decarbonylation, and dehydration of surface-bound oxyhydrocarbyl groups, including CO$_2$H functional groups and initiator molecules. In contrast, thermal decomposition of the UDD-POMA-1 polymer brush aliquots occurs as a single, mass-loss event from 220° C. to 450° C. due to the grafted polymer content of this material. This event parallels that observed for pure POMA and is clearly associated with the thermal decomposition of surface-grafted POMA polymer chains. The polymer brush content of the UDD-POMA samples was determined by the TGA traces.

Figure 32:
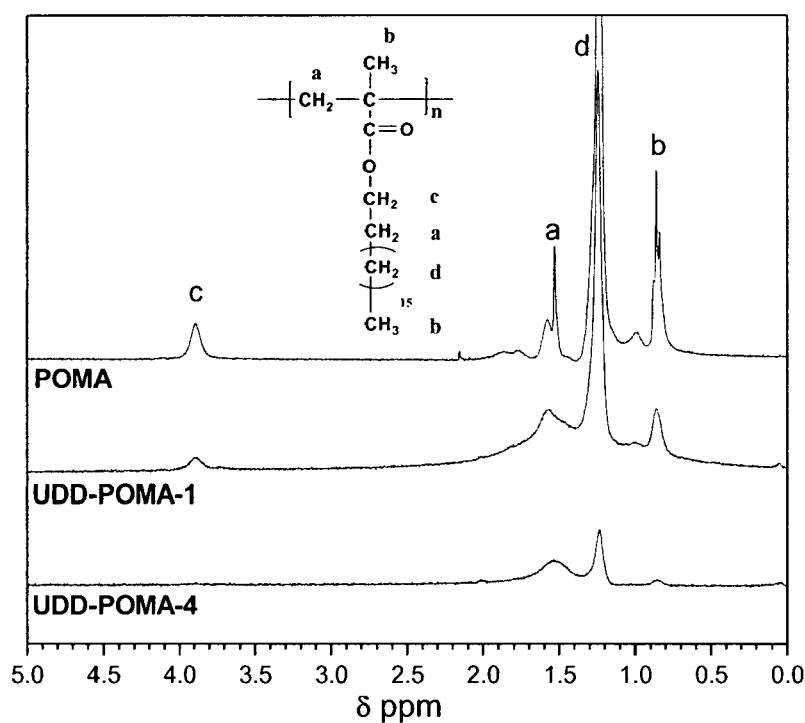

$^1$H-NMR spectra of UDD-POMA polymer brushes and of POMA pure polymer are shown in FIG. 32. Resonances observed at 0.83 ppm, 1.25 ppm, 1.50 ppm and 3.85 ppm for the UDD-POMA-1 polymer brush are readily assigned to the corresponding resonances of the analogous free polymer with only a small degree of relaxation broadening observed. However, the UDD-POMA-4 polymer brush with less polymer content in the sample has much weaker and wider broad resonance signals at 0.83 ppm, 1.25 ppm, and 1.50 ppm while the resonance at 3.85 ppm is absent. These results indicate good extension of the polymer chains into the solution phase can be achieved by increasing the polymer brush content in the UDD-POMA sample to a certain level, ca. 55 wt %, in this case.

Figure 33:
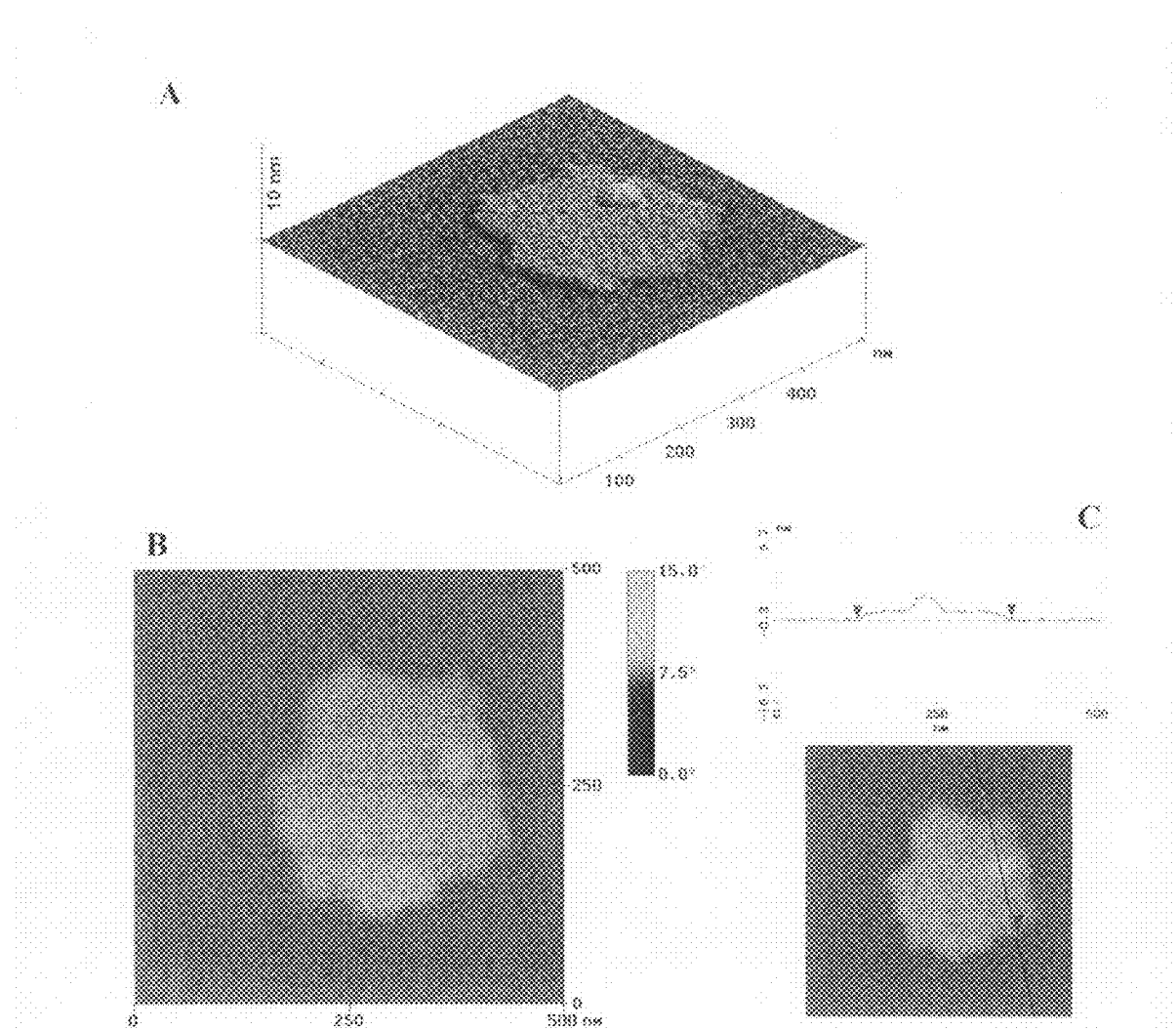
Figure 34:
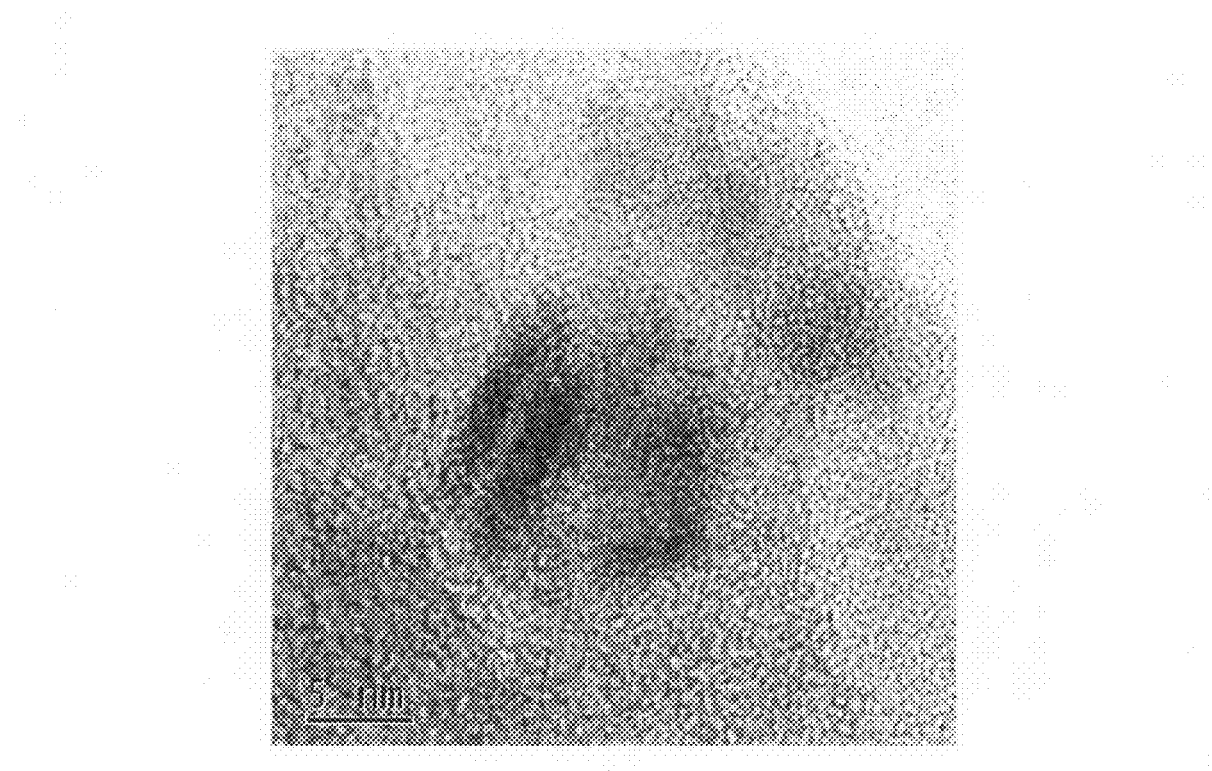

Direct observation of UDD-POMA polymer brush was achieved by tapping mode AFM. The height and phase images of an individual UDD aggregate covered by grafted polymer brushes on a mica surface are shown in FIG. 33. The centered UDD aggregate has a diameter about 70 nm and the surrounding polymer brush chains extend from 40 nm to 200 nm, indicating the broad distribution of the chain length of the grafted polymer chains. A complementary high resolution TEM image of the UDD-POMA polymer brush is shown in FIG. 34. Several UDD nanoparticles 4 nm to 10 nm in diameter with clear crystalline fringes are embedded in the polymer matrix.

The dispersibility test of the UDD-POMA sample in common organic solvents indicated that the grafted POMA polymer brush greatly improved the dispersibility of UDD-POMA compared with that of the as-received UDD. Particularly, due to the ultra-hydrophobic nature of the POMA polymer chains the UDD-POMA sample can be dispersed into industrial transformer oil to form relatively stable suspension with the concentration up to 33.5 mg/mL or 1.0% in volume concentration for more than 1 week before the UDD-POMA started to precipitate. The dispersions of UDD-POMA in transformer oil, also named as nanofluids, are ready for thermal conductivity measurement.

Figure 35:
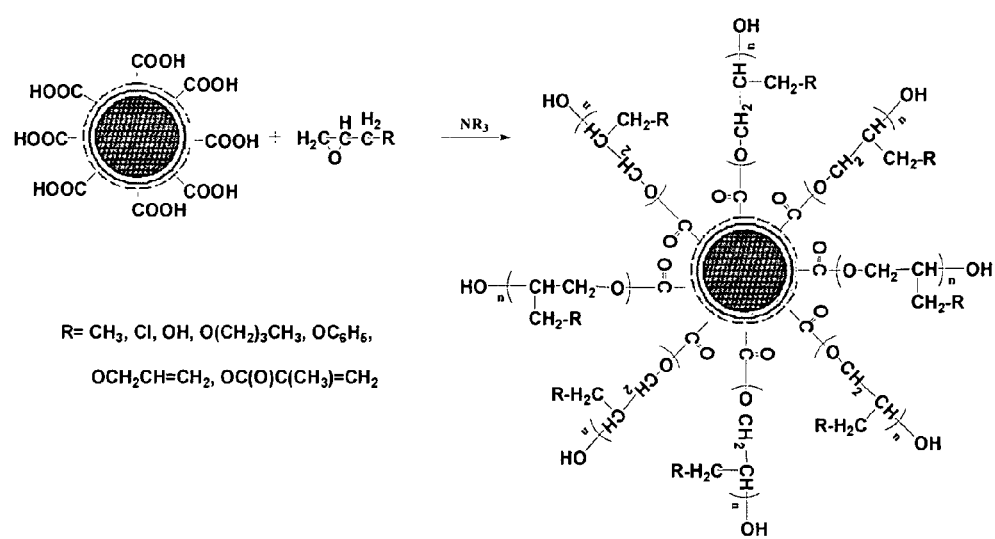

The following examples demonstrate the synthesis of diamond/epoxide hybrid materials according to the reaction scheme depicted in FIG. 35.

Example 17

Synthesis and Characterization of UDD-Glycidyl Methacrylate (UDD-GMA-1)

A 25 mL round-bottomed flask, with a magnetic stir bar, was charged with 0.4 g as-received UDD and 0.19 g 4-methoxyphenol (MEHQ). The flask was sealed with a rubber septum and degassed and refilled with $N_2$ three times. 16 mL GMA was added by syringe and the reaction mixture was sonicated 10 min followed by the addition of 0.5 mL PMDETA via syringe. The flask was placed into a room temperature oil bath. After 24 h., the reaction mixture was diluted with methanol. The mixture was centrifuged and washed with methanol six times to remove ungrafted oligomers. The solid product of UDD-GMA was collected and dried in the vacuum oven overnight at room temperature.

Example 18

Synthesis of UDD-Allyl Glycidyl Ether (UDD-AGE-1)

A 25 mL round-bottomed flask, with a magnetic stir bar, was charged with 0.4 g as-received UDD. The flask was sealed with a rubber septum and degassed and refilled with $N_2$ three times. 16 mL AGE was added by syringe and the reaction mixture was sonicated 10 min followed by the addition of 0.56 mL PMDETA via syringe. The flask was placed into a 70° C. oil bath. After 24 h., the reaction mixture was cooled down to room temperature and diluted with methanol. The mixture was centrifuged and washed with methanol six times to remove ungrafted oligomers. The solid product of UDD-AGE was collected and dried in the vacuum oven overnight at room temperature.

Example 19

Synthesis of UDD-Butyl Glycidyl Ether (UDD-AGE-1)

A 25 mL round-bottomed flask, with a magnetic stir bar, was charged with 0.4 g as-received UDD. The flask was sealed with a rubber septum and degassed and refilled with $N_2$ three times. 16 mL BGE was added by syringe and the reaction mixture was sonicated 10 min followed by the addition of 0.56 mL PMDETA via syringe. The flask was placed into a 70° C. oil bath. After 24 h., the reaction mixture was cooled down to room temperature and diluted with methanol. The mixture was centrifuged and washed with methanol six times to remove ungrafted oligomers. The solid product of UDD-BGE was collected and dried in the vacuum oven overnight at room temperature.

Example 20

Synthesis of UDD-Butyl Phenyl Glycidyl Ether (UDD-PGE-1)

A 25 mL round-bottomed flask, with a magnetic stir bar, was charged with 0.4 g as-received UDD. The flask was sealed with a rubber septum and degassed and refilled with $N_2$ three times. 16 mL PGE was added by syringe and the reaction mixture was sonicated 10 min followed by the addition of 0.56 mL PMDETA via syringe. The flask was placed into a 70° C. oil bath. After 24 h., the reaction mixture was cooled down to room temperature and diluted with methanol. The mixture was centrifuged and washed with methanol six times to remove ungrafted oligomers. The solid product of UDD-PGE was collected and dried in the vacuum oven overnight at room temperature.

Example 21

Synthesis of UDD-1,2-epoxybutane (UDD-EB-1)

A 25 mL round-bottomed flask, with a magnetic stir bar, was charged with 0.2 g as-received UDD. The flask was sealed with a rubber septum and degassed and refilled with $N_2$ three times. 8 mL 1,2-epoxybutane was added by syringe and the reaction mixture was sonicated 10 min followed by the addition of 0.28 mL PMDETA via syringe. The flask was placed into a 70° C. oil bath. After 24 h., the reaction mixture was cooled down to room temperature and diluted with methanol. The mixture was centrifuged and washed with methanol six times to remove ungrafted oligomers. The solid product of UDD-EB was collected and dried in the vacuum oven overnight at room temperature.

Example 22

Synthesis of UDD-Epichlorohydrin (UDD-ECl-1)

A 25 mL round-bottomed flask, with a magnetic stir bar, was charged with 0.4 g as-received UDD. The flask was sealed with a rubber septum and degassed and refilled with $N_2$ three times. 16 mL epichlorohydrin was added by syringe and the reaction mixture was sonicated 10 min followed by the addition of 0.56 mL PMDETA via syringe. The flask was placed into a 70° C. oil bath. After 24 h., the reaction mixture was cooled down to room temperature and diluted with methanol. The mixture was centrifuged and washed with methanol six times to remove ungrafted oligomers. The solid product of UDD-ECl was collected and dried in the vacuum oven overnight at room temperature.

Example 23

Synthesis of UDD-Glycidol-1

A 25 mL round-bottomed flask, with a magnetic stir bar, was charged with 0.4 g as-received UDD. The flask was sealed with a rubber septum and degassed and refilled with $N_2$ three times. 16 mL Glycidol was added by syringe and the reaction mixture was sonicated 10 min followed by the addition of 5.6 µL PMDETA via syringe. The flask was placed into a 50° C. oil bath. After 24 h., the reaction mixture was cooled down to room temperature and diluted with methanol. The mixture was centrifuged and washed with methanol six times to remove ungrafted oligomers. The solid product of UDD-Glycidol-1 was collected and dried in the vacuum oven overnight at room temperature.

Example 24

Synthesis of UDD-Glycidol-2

A 25 mL round-bottomed flask, with a magnetic stir bar, was charged with 0.4 g as-received UDD. The flask was sealed with a rubber septum and degassed and refilled with $N_2$ three times. 16 mL Glycidol was added by syringe and the reaction mixture was sonicated 10 min. The flask was placed into a 75° C. oil bath. After 24 h., the reaction mixture was cooled down to room temperature and diluted with methanol. The mixture was centrifuged and washed with methanol six times to remove ungrafted oligomers. The solid product of UDD-Glycidol-2 was collected and dried in the vacuum oven overnight at room temperature.

The ring opening reaction of epoxides can be initiated by either a cationic mechanism or anionic mechanism. The ring opening reaction between carboxylic acid and epoxides could result in oligomerization or polymerization of epoxides when tertiary amine reagents are used as catalyst in the reaction system. The UDD nanoparticles have surface functional groups of carboxylic acids which can be used as initiating sites on the surface of the UDD nanoparticles to carry out oligomerization or polymerization of epoxide monomers by anionic ring opening polymerization mechanism. We examined a series of epoxide monomers with different functionalities such as alkyl, allyl, phenyl, methacrylate and hydroxyl groups in order to demonstrate the surface initiated oligomerization or polymerization of epoxides can be succeed by simple reaction of as-received UDD nanoparticles and epoxide monomers in the presence or absence of tertiary amines as catalysts.

Figure 36:
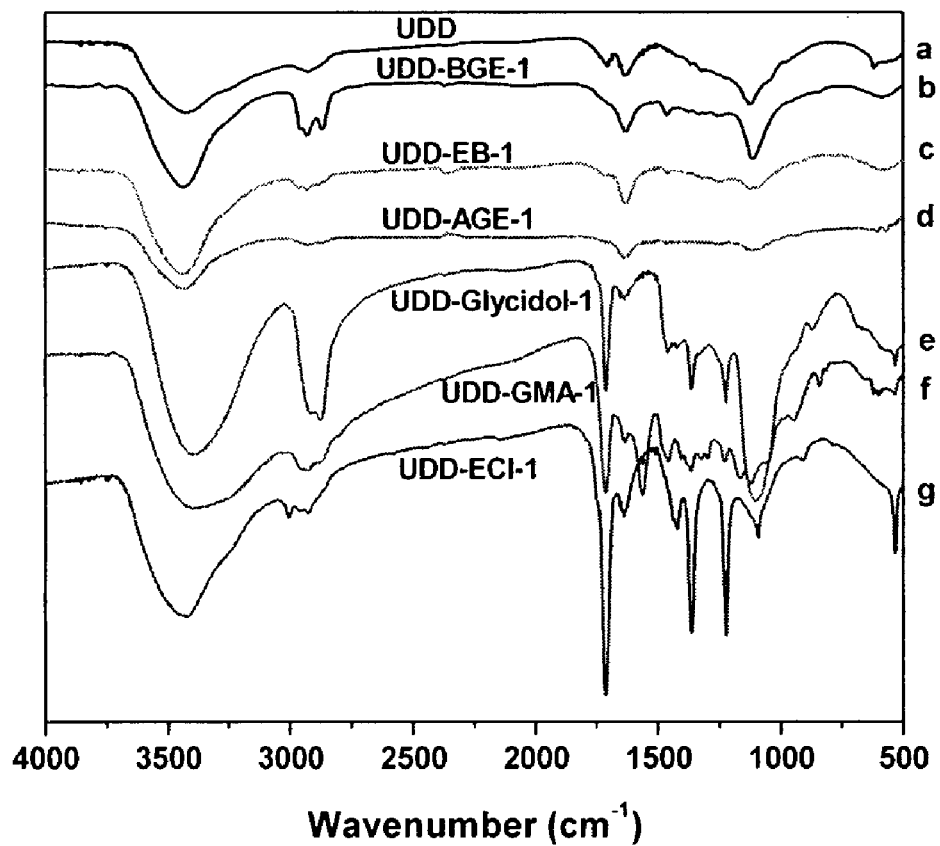
Figure 37:
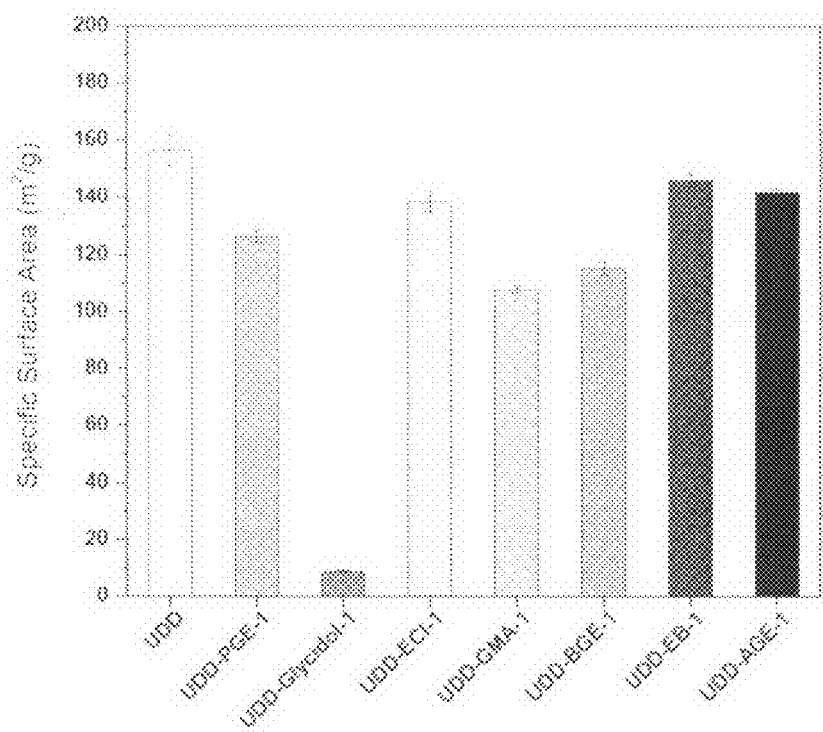

Table 7 shows the reaction conditions and results of as-received UDD nanoparticles and epoxide monomers. The organic content in the resultant UDD-epoxide hybrid materials varies from 4.0 wt % to 74.6 wt % according to the TGA results. The FT-IR spectra (FIG. 36) of as-received UDD and UDD-epoxide hybrid materials reveal that different functionalities have been incorporated to the UDD nanoparticles by surface grafting of oligomers or polymers of epoxides, respectively. Bands observed at 3450 $cm^{-1}$ and 1737 $cm^{-1}$ for UDD are assigned to O—H and carboxyl group C=O stretching bands resulting from UDD surface carboxylic acid groups. Intense band at 1730 $cm^{-1}$ for UDD-GMA-1 are assigned to C=O stretching bands of the ester functional groups within GMA oligomer chains and FT-IR spectra of UDD-BGE-1 and UDD-Glycidol-1 also show strong bands centered at 2930 $cm^{-1}$ and 2850 $cm^{-1}$ for C—H stretching modes. Specific surface area analysis by BET (FIG. 37) also confirms the surface grafted oligomers and polymers of epoxides. Since the surface of UDD nanoparticles is covered by oligomers and polymers in the UDD-epoxide hybrid materials, the specific surface area decreases from 156.3 $m^2/g$ for as-received UDD to 8.9 $m^2/g$ for UDD-Glycidol-1.

TABLE 7

Reaction conditions of as-received UDD and epoxide monomers

| Sample | Epoxide Monomer | UDD/PMDETA/Epoxide | Temp (° C.) | Time (h) | Organic Content | BET ($m^2/g$) |
|---|---|---|---|---|---|---|
| UDD-BGE-1 |  | 0.4 g/0.56 mL/16 mL | 70 | 24 | 13.2% | 115.3 |
| UDD-PGE-1 |  | 0.4 g/0.56 mL/16 mL | 70 | 24 | 11.0% | 126.5 |
| UDD-EB-1 |  | 0.2 g/0.28 mL/8 mL | 70 | 24 | 4.0% | 146.1 |
| UDD-AGE-1 | 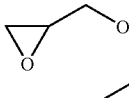 | 0.4 g/0.56 mL/16 mL | 30 | 24 | 7.6% | 141.9 |
| UDD-ECl-1 | 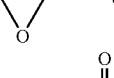 | 0.4 g/0.56 mL/16 mL | 70 | 24 | 4.5% | 138.4 |
| UDD-GMA-1 | 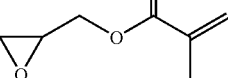 | 0.4 g/0.56 mL/16 mL/ MEHQ 0.19 g | 30 | 24 | 14.4% | 108 |

TABLE 7-continued

Reaction conditions of as-received UDD and epoxide monomers

| Sample | Epoxide Monomer | UDD/PMDETA/Epoxide | Temp (° C.) | Time (h) | Organic Content | BET ($m^2/g$) |
|---|---|---|---|---|---|---|
| UDD-Glycidol-1 | (glycidol structure) OH | 0.4 g/5.6 µL/16 mL | 50 | 24 | 42.3% | 8.9 |
| UDD-Glycidol-2 | (glycidol structure) OH | 0.4 g/16 mL | 75 | 24 | 74.6% | |

Figure 38:
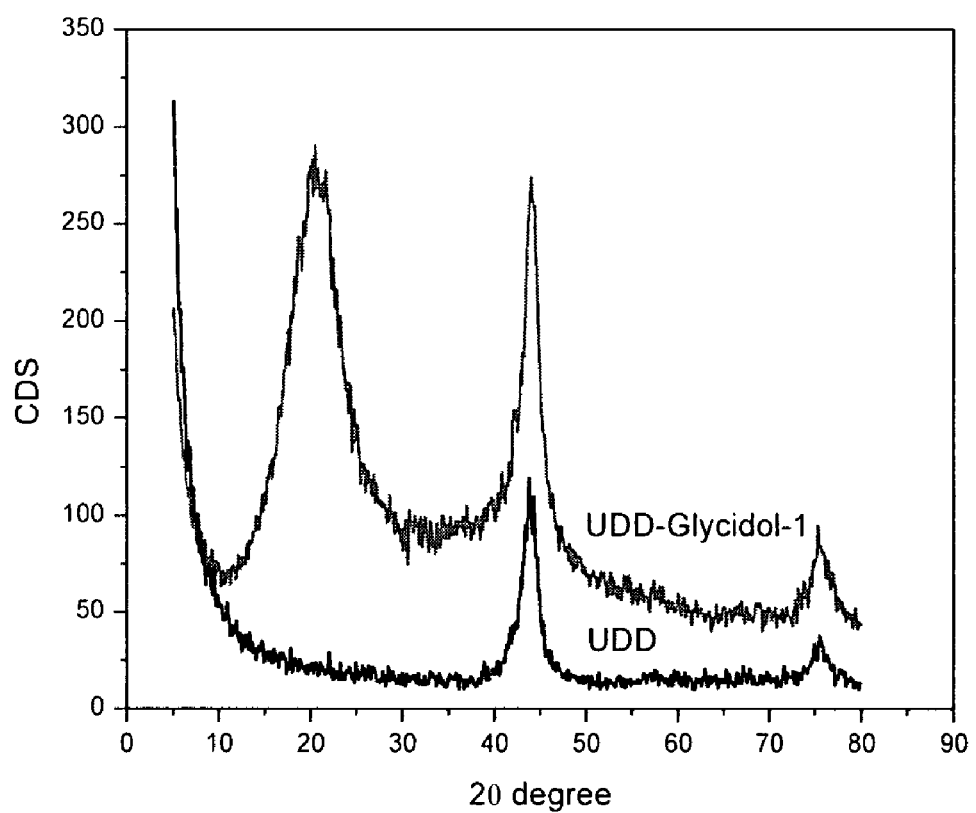
Figure 39:
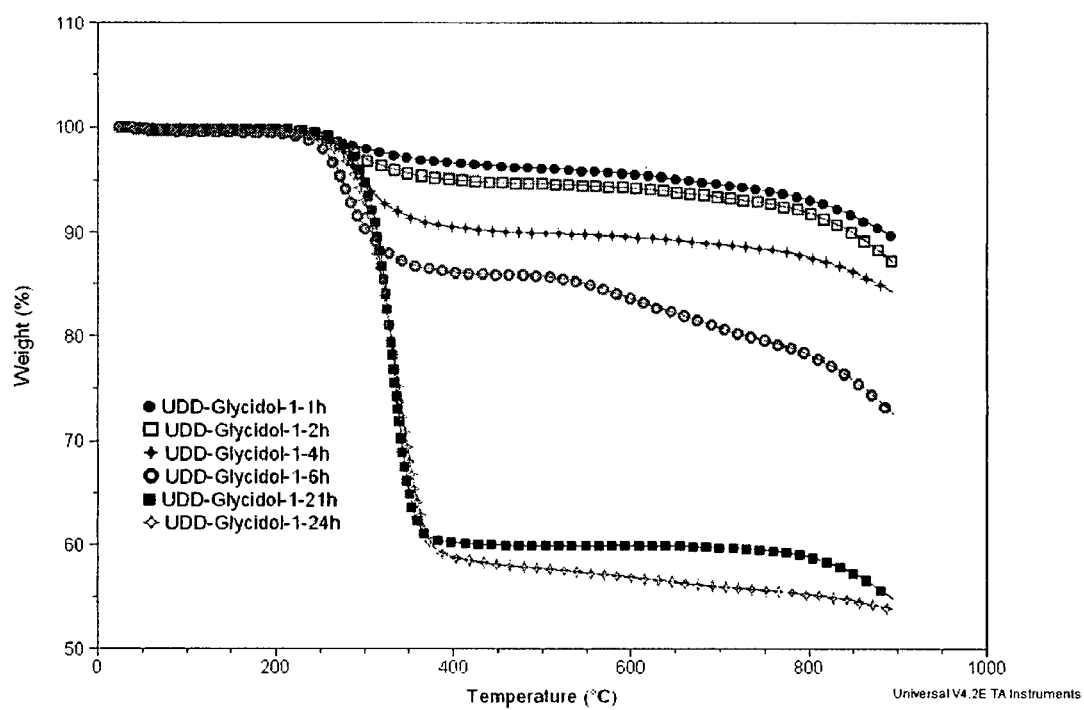
Figure 40:
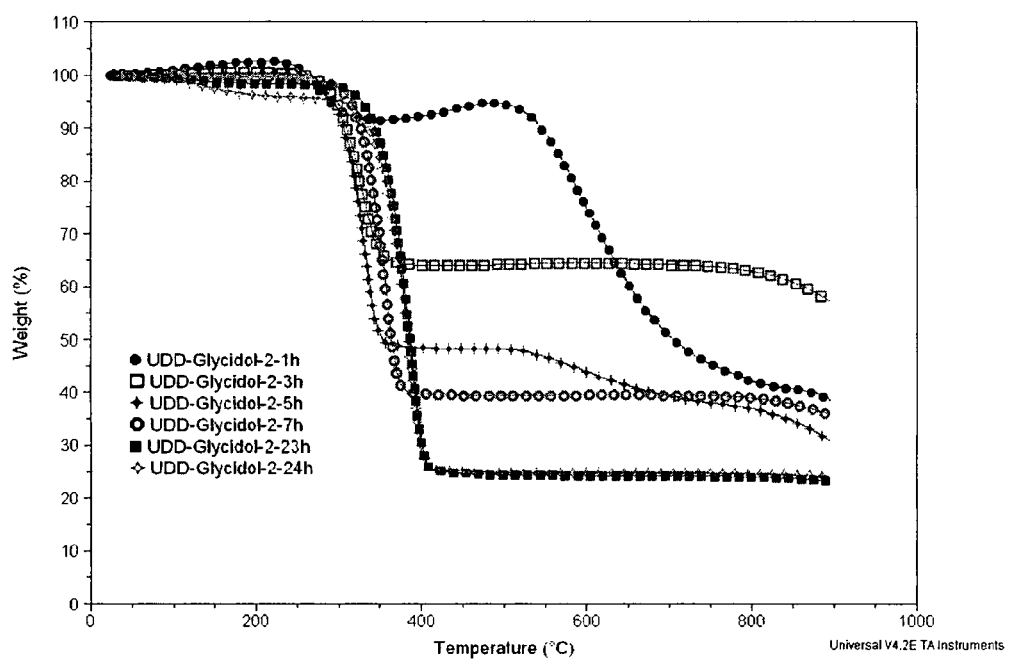

The reaction of UDD and glycidol was carried out in either the presence or the absence of tertiary amine. The resultant UDD-epoxide hybrid materials have different structures with as-received UDD. The XRD scans of as-received UDD and UDD-Glycidol-1 (FIG. 38) reveal that the new intense peak near 20° in 2θ for UDD-Glycidol-1 is from the structure of glycidol polymers while the UDD structure of peaks near 44° in 2θ and 75° in 2θ is still characteristic. It was reported that ring opening polymerization of glycidol can be performed at room temperature with tertiary amines as catalyst in a very fast polymerization rate. The surface initiated ring opening polymerization of glycidol, however, can be effected by the tertiary amine catalyst and reaction temperature as the results in table 1 indicates. The addition of PMDETA as catalyst at the temperature of 50° C. (UDD-Glycidol-1) resulted in 42.3 wt % of polymers in the UDD-epoxide hybrid material and the reaction between UDD and glycidol without PMDETA at 70° C. (UDD-Glycidol-1) resulted in 74.6 wt % of polymers, respectively. The kinetic difference between these two reactions can be obtained from the TGA traces in FIG. 39 and FIG. 40.

Example 25

UDD-PGMA/Commercial Epoxy Resin (EPON 828) Hybrid Material: Fabrication and Characterization Within a 100 mL beaker, 2.0 g $BF_3$.MEA was dissolved in 20.0 g EPON 828 epoxy resin at 80° C. UDD-PGMA-4 (4.15 g) and butyl glycidyl ether (10.0 g) were added into a 50 mL beaker and sonicated for 1 h to form an even dispersion. Then the dispersion was filtered though 50 mesh copper gauze into the epoxy resin beaker and sonicate for 1 h. The mixture was poured into the preheated mold in an oven at 50° C. and degassed in vacuum for 1 h. After releasing the vacuum to normal pressure, the oven temperature was raised to 120° C. for 1 h and further to 170° C. for 4 h to ensure the complete curing of the epoxy resin.

A series of nanocomposites of UDD-PGMA-4 dispersed into epoxy resin matrix were prepared by casting UDD-PGMA polymer brush/epoxy dispersion into a 10 cm×10 cm×1 cm mold and curing completely at elevated temperature. The concentration of UDD-PGMA (calculated in terms of pure UDD) varied from 1.23 wt % to 10.46 wt % and no visible UDD agglomerations were observed in all the specimens, while the control composite specimen of as-received UDD in epoxy matrix had large visible phase separation, indicating the grafted polymer brushes dramatically improved the dispersibility of UDD-PGMA in epoxy matrix. Given that the functional epoxide groups of the PGMA brushes are chemically bound to the matrix epoxy resin during the curing process, the mechanical properties of the epoxy/UDD-PGMA composites are much better than that of the pure epoxy resin and the epoxy/UDD composites.

Figure 41:
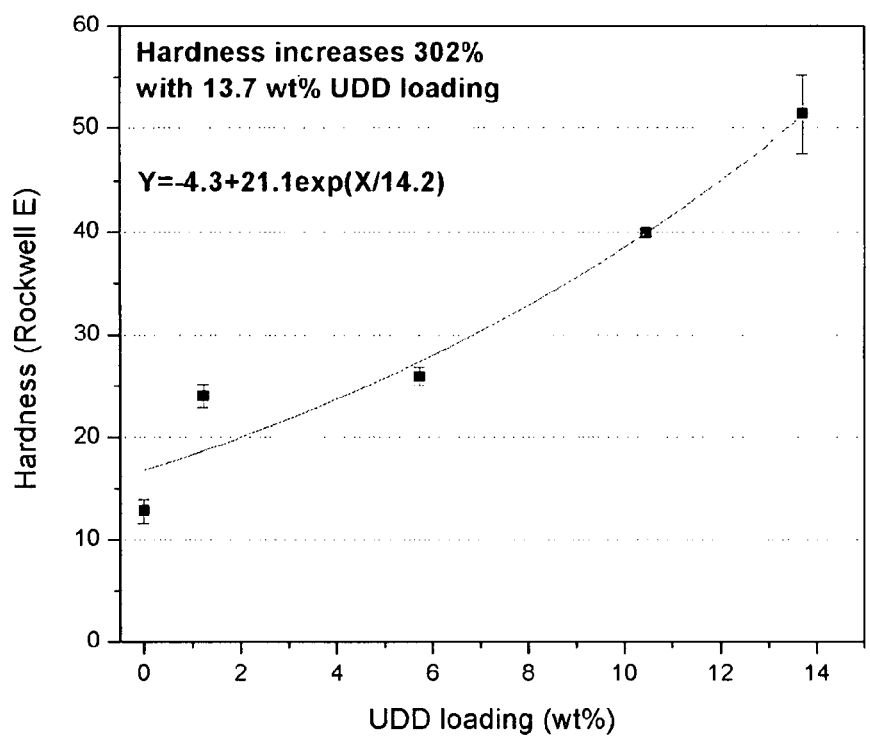
Figure 42:
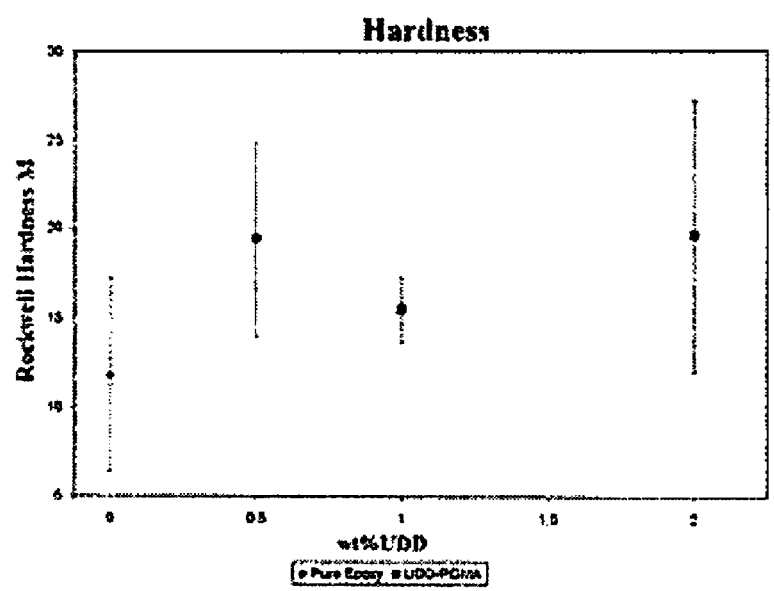
Figure 43:
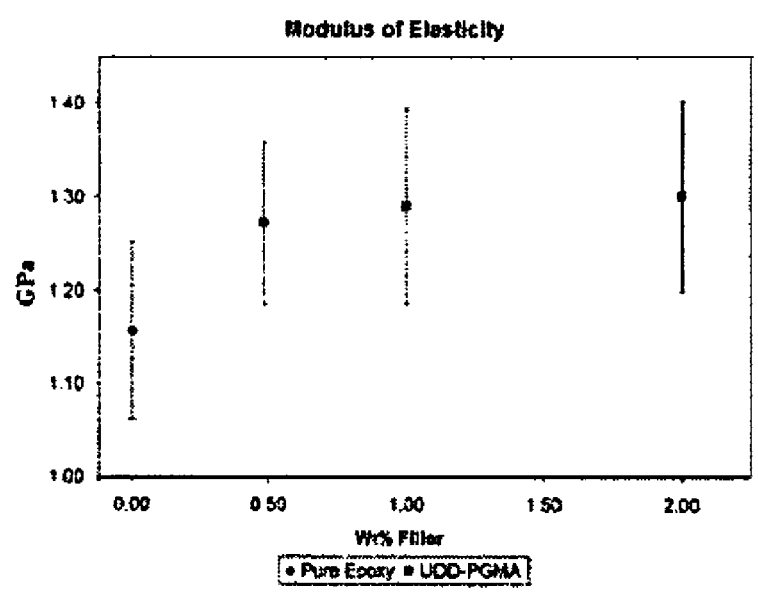
Figure 44:
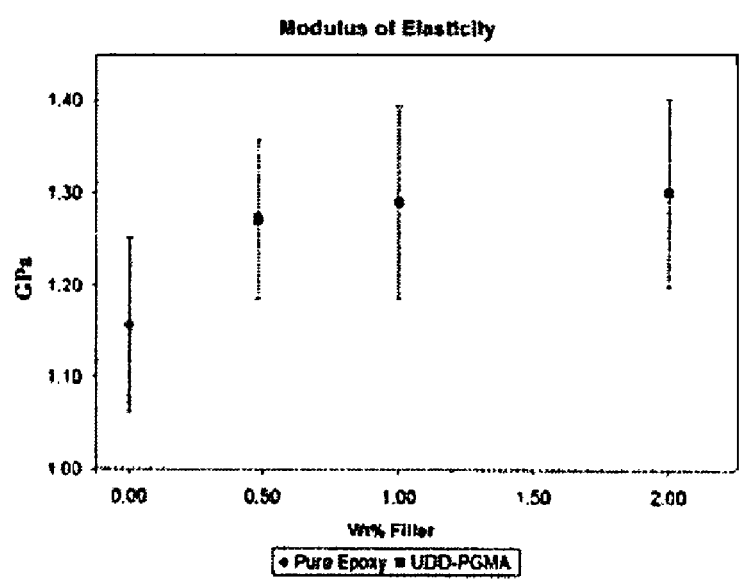

Due to the ultra hard characteristic of UDD, great improvement of hardness can be obtained in the epoxy/UDD-PGMA composites. FIG. 41 shows the non-linear increase of Rockwell E hardness of the composites with increased UDD loading. The highest value of hardness 51.4 was obtained at 13.7 wt % UDD loading, which is about 302% over the pure epoxy with hardness of 12.8.

Example 26

Synthesis of UDD-poly(glycidylmethacrylate) [UDD-PGMA]

Deoxygenate diphenyl ether (DPE) and glycidyl methacrylate (GMA) with $N_2$ for 30 minutes. In a dried 25 mL round-bottom flask, add magnetic stir bar, 8.0 mg $CuCl_2$ and 0.20 g UDD-Cl. Seal with rubber septum, degas and fill with $N_2$ three times. Add 4 mL DPE via syringe. Freeze in liquid nitrogen, degas, fill with $N_2$, thaw three times. Sonicate 10 minutes. In a 10 mL round-bottom flask, add magnetic stir bar, 60.0 mg CuCl, seal with rubber septum, degas and fill with $N_2$ three times. Add 4 mL GMA via syringe and stir for 15 minutes. Transfer monomer solution to UDD-Cl flask via syringe and place in room temperature oil bath, stirring, for 24 hours. Dilute with $CHCl_3$ and pour into two 15 mL centrifuge tubes. Wash by centrifuging 10 minutes, pour off supernatant, add $CHCl_3$/methanol (in 9/1 v/v ratio) until supernatant is colorless. Dry in vacuum oven overnight at room temperature.

Example 27

Fabrication and Characterization of UDD-PGMA/DER 331/DER 736 Epoxy Composite Test Specimens (0.5 wt % UDD)

In a 25 mL beaker, mix 20.0 g DER 736 epoxy resin and 0.421 g UDD-PGMA. Stir until uniform, sonicate 90 minutes. In 50 mL flask, add 20.0 g DER 331 epoxy resin and strain UDD-PGMA/DER 736 mixture over 50 mesh copper grid and into DER 331. Stir to uniform and sonicate 60 minutes. Add 10.2 g aminoethylpiperazine (AEP), stir to uniform, cast mixture into mold, place in vacuum oven under vacuum 1 hour. Cure at room temperature and pressure 4 hours, cure at 60° C. for 20 hours, remove from oven and let cool at room temperature and pressure.

The enhanced mechanical properties of the UDD-PGMA/epoxy composites are shown in the figures below. At 0.5 wt % UDD content, the test specimens show a 9.9% enhancement in modulus of elasticity and a 20.1% enhancement in tensile strength when compared to the control (unfilled) samples.

Similarly, the UDD-PGMA/epoxy composite samples show a significant increase in hardness. Modulus of elasticity and ultimate tensile strength were measured using an Instru-met model TTC-102 mL loadframe in accordance to ASTM D 638. Hardness data was measured using an Instron Wilson/Rockwell hardness testing machine, model #C523 R, in accordance with ASTM D785 testing standards.

Example 28

Synthesis and Characterization of UDD-Poly(methylmethacrylate) [UDD-PMMA]

Degas dimethyl formamide (DMF) and methylmethacrylate (MMA) for 1 hour. In a 50 mL round-bottomed flask, add 0.30 UDD-Cl, 0.324 CuBr, 0.0504 g $CuCl_3$, and a magnetic stir bar. Seal with rubber septum, degas and fill with $N_2$ three times. Add 12 mL DMF via degassed syringe, stir 2 minutes, sonicate 60 minutes, add 12 mL MMA via degassed syringe, stir 5 minutes. Add 0.52 mL pentamethyldiethylenetriamine (PMDETA), stir 5 minutes, place in 70° C. oil bath and stir 16 hours. Remove from oil bath and let cool. Dilute with acetone and pour into 2 50 mL centrifuge tubes. Spin two hours, pour off supernatant, dilute with acetone. Centrifuge 30 minutes, pour off supernatant, disperse in acetone. Repeat until supernatant is clear. Do not dry.

Example 29

Synthesis of UDD-PMMA/PMMA Blended Composite

In a 25 mL round-bottomed flask, add magnetic stir bar, 1.5 g PMMA and 10 mL acetone. Set on stir plate until polymer is completely dissolved. While stirring, slowly add 2 mL of UDD-PMMA diluted in acetone and stir for 20 minutes. Repeat two more times. Pour flask contents onto large watch glass and let solvent evaporate in fume hood.

The invention claimed is:

1. A composite comprising at least one nanoparticulate diamond/polymer brush prepared by a liquid process starting with oxidized nanoparticulate diamond surfaces, said liquid process including atom-transfer-radical polymerization.

2. The composite of claim 1 wherein said atom-transfer-radical polymerization is conducted employing grafted-from synthesis.

3. The composite of claim 2 wherein said polymerization occurs via atom-transfer-radical-polymerization initiators.

4. The composite of claim 1 wherein said nanoparticulate diamond/polymer brush comprises a hydrophobic polymer.

5. The composite of claim 1 wherein said nanoparticulate diamond/polymer brush comprises a hydrophilic polymer.

6. A method of making a composite comprising at least one nanoparticulate diamond/polymer brush comprising covalently bonding said polymer to said diamond surface by a liquid process starting with oxidized nanoparticulate diamond surfaces, said liquid process including atom-transfer-radical polymerization.

7. The method of claim 6 wherein said atom-transfer-radical-polymerization is conducted employing grafted-from synthesis.

8. The method of claim 7 wherein said atom-transfer-radical-polymerization occurs via atom-transfer-radical-polymerization initiators.

9. An article of manufacture formed from the composite of claim 1.

* * * * *